United States Patent
Ho et al.

(10) Patent No.: US 10,626,220 B2
(45) Date of Patent: *Apr. 21, 2020

(54) PRECURSOR FOR POLYIMIDE AND USE THEREOF

(71) Applicant: ETERNAL MATERIALS CO., LTD., Kaohsiung (TW)

(72) Inventors: Chang-Hong Ho, Kaohsiung (TW); Chung-Jen Wu, Kaohsiung (TW); Meng-Yen Chou, Kaohsiung (TW); Shun-Jen Chiang, Kaohsiung (TW); Po-Yu Huang, Kaohsiung (TW); Chung-Kai Cheng, Kaohsiung (TW)

(73) Assignee: ETERNAL MATERIALS CO., LTD., Kaohsiung (TW)

( * ) Notice: Subject to any disclaimer, the term of this patent is extended or adjusted under 35 U.S.C. 154(b) by 52 days.

This patent is subject to a terminal disclaimer.

(21) Appl. No.: 15/825,326

(22) Filed: Nov. 29, 2017

(65) Prior Publication Data
US 2018/0148544 A1    May 31, 2018

(30) Foreign Application Priority Data
Nov. 30, 2016  (TW) ............................. 105139586 A

(51) Int. Cl.
 *C08G 73/14* (2006.01)
 *C08G 69/44* (2006.01)
 *C08G 81/02* (2006.01)
 *C08K 5/095* (2006.01)

(52) U.S. Cl.
CPC ............ *C08G 73/14* (2013.01); *C08G 69/44* (2013.01); *C08G 81/028* (2013.01); *C08K 5/095* (2013.01)

(58) Field of Classification Search
CPC ...... C08G 73/14; C08G 81/028; C08G 69/44; C08G 73/101; C08G 73/1067; C08G 73/1007; C08K 5/095; C08J 2379/08; C08J 5/18
USPC ................................................ 528/330, 310
See application file for complete search history.

(56) References Cited

U.S. PATENT DOCUMENTS

| | | | | |
|---|---|---|---|---|
| 5,382,637 A * | 1/1995 | Angelopoulos | ...... | C08G 73/101 522/146 |
| 6,605,353 B2 | 8/2003 | Okada et al. | | |
| 7,989,578 B2 * | 8/2011 | Wu | ...... | C08F 290/06 430/283.1 |
| 9,334,369 B2 * | 5/2016 | Cheng | ...... | C07D 233/90 |
| 2004/0029045 A1 | 2/2004 | Nunomura et al. | | |
| 2008/0096997 A1 * | 4/2008 | Wu | ...... | C07C 233/78 522/36 |
| 2010/0168265 A1 * | 7/2010 | Wu | ...... | C08G 73/1042 522/33 |
| 2011/0086311 A1 | 4/2011 | Katayama et al. | | |
| 2012/0235315 A1 * | 9/2012 | Wu | ...... | H01L 21/6835 264/104 |
| 2013/0172494 A1 * | 7/2013 | Cheng | ...... | C07D 233/90 525/421 |
| 2016/0369056 A1 * | 12/2016 | Wu | ...... | C08G 73/106 |
| 2018/0148541 A1 * | 5/2018 | Ho | ...... | C08G 73/122 |
| 2018/0194899 A1 * | 7/2018 | Huang | ...... | G03F 7/0046 |
| 2018/0282482 A1 * | 10/2018 | Chou | ...... | C08G 73/0273 |
| 2018/0282577 A1 * | 10/2018 | Cheng | ...... | C09J 7/35 |

FOREIGN PATENT DOCUMENTS

| | | | | |
|---|---|---|---|---|
| JP | 2009052042 A | * | 3/2009 | |
| TW | 200906910 A | | 2/2009 | |

OTHER PUBLICATIONS

Computer generated English translation of TW200906910A.

* cited by examiner

*Primary Examiner* — Douglas J McGinty
(74) *Attorney, Agent, or Firm* — Ladas & Parry LLP

(57) ABSTRACT

The present invention provides an amic acid ester oligomer having a structure of Formula (1) or (1'):

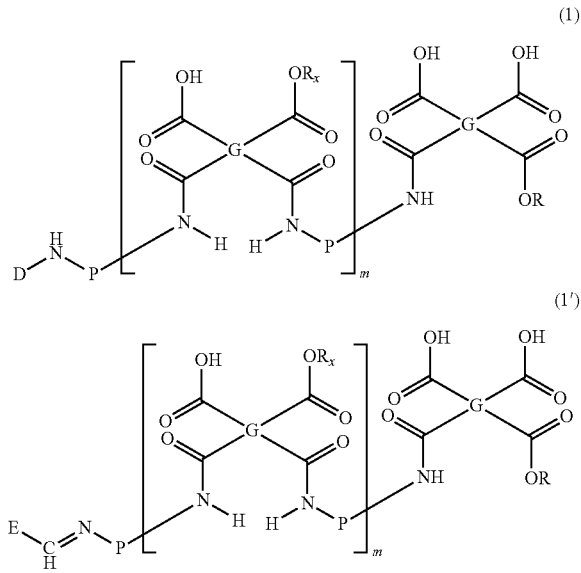

wherein G, P, R, $R_x$, D, E and m are as defined in the specification. The present invention also provides a polyimide precursor composition comprising the amic acid ester oligomer, as well as a polyimide prepared from the composition.

18 Claims, No Drawings

PRECURSOR FOR POLYIMIDE AND USE THEREOF

BACKGROUND OF E INVENTION

1. Field of the Invention

The present invention relates to a polyimide (PI) precursor, and also to use of the precursor in the preparation of PI.

2. Description of the Related Art

Since polyimides possess excellent thermal stability and good mechanical, electrical, and chemical properties, they have been used as high performance polymers. Polyimides are quite important in the applications to the integrated circuit industry, electronic packaging, enamelled wires, printed circuit boards, sensing elements, separating films, and structural materials, and play the part of critical materials.

Polyimides are typically synthesized by a two-stage polymerization and condensation reaction. Normally, in the first stage, a diamine monomer is dissolved in a polar aprotic solvent, such as N-methylpyrrolidone (NMP), N,N-dimethylacetamide (DMAC), dimethylformamide (DMF), or dimethyl sulfoxide (DMSO). An equivalent of a dianhydride monomer is then added. Afterwards, the condensation reaction is conducted at a low temperature or room temperature to form a precursor for the polyimide, i.e., poly(amic acid) (PAA). In the second stage, a thermal imidization or chemical imidization is carried out in order to achieve a condensation, dehydration, and cyclization reaction so as to convert the poly(amic acid) into polyimide. The reaction scheme for preparing polyimides can be briefly described as follows:

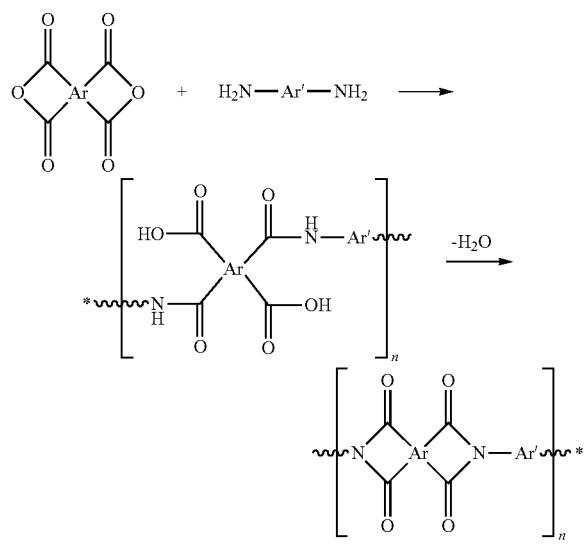

In the above preparation method, if the molecular weight of the poly(amic acid) obtained in the first stage does not reach a certain standard (i.e., it is overly low), a polyimide film with good physical properties cannot be obtained after imidization. However, if the poly(amic acid) obtained in the first stage is overly high in molecular weight, its viscosity will be too high and its operability will become poor. In addition, poor leveling occurs easily in the coating step. Moreover, if the poly(amic acid) is overly high in molecular weight, an extremely strong internal stress is produced due to the interaction between molecules and the shortening of molecular chains in the imidization of the second stage. The strong internal stress causes the coated substrate to bend and deform.

Taiwan Patent Application No. 096128743 discloses an amic acid ester oligomer useful as a polyimide precursor. The amic acid ester oligomer has an amino group at one end, and both an ester group (—COOR) and a carboxyl group as terminal groups at the other end, and is in a meta-stable status. However, in long-term storage, a few amino groups in numerous molecules of the amic acid ester oligomer react with the terminal groups as the other end (that is, the ester group (—COOR) and the carboxyl group (—COOH)), causing an elevated viscosity and thus poor operability. Moreover, the terminal amino group of the amic acid ester oligomer is prone to react with a dehydrating agent, and thus not applicable to chemical imidization (low-temperature cyclization), and can only be restricted to the conventional imidization by heating at a high temperature (high-temperature cyclization). Furthermore, upon thermal imidization, 100% imidization generally can be realized only by continuously heating at a high temperature of 300° C. for several hours. This process is time consuming and easily brings safety problems during operation. In addition, when the product has a side chain with low bond energy, the side chain will often be destroyed before cyclization in the high temperature environment.

Photosensitive polyimide (PSPI) is imparted with photosensitivity by introducing a photosensitive group to the stricture of polyimide or a precursor thereof, whereby the polyimide not only retains the original excellent mechanical and electrical properties, but also has a photosensitive feature. In the manufacturing process of semiconductors, photosensitive polyimide is used in place of the previous photoresist. Thus, the process steps are simplified, which contributes to the improvement of the yield and the reduction of the cost.

An acryloyloxy group-containing photosensitive polyimide is known in the art. However, such group affects the desired properties of polyimide. Therefore, it needs to be removed after exposure. Nevertheless, compounds containing acryloyloxy group typically have a boiling point of up to 250° C. If such photosensitive polyimides are used in the manufacturing process of semiconductors, a higher hardbake temperature is required.

U.S. Pat. No. 6,605,353 discloses an epoxy-modified photosensitive polyimide. However, since the polymer is obtained by reacting an epoxide with an acid, the reactivity is poor. Moreover, the OH functional group produced after the ring opening may react with the epoxy group, and therefore, the problems of lacking stability and thermal stability exist.

In view of this, the present invention is directed to research results made for the above-mentioned problems. The present inventors found a new amic acid ester oligomer, which not only has the advantages of low molecular weight, high coatability and storage stability, but also can carry out cyclodehydration at a low temperature, to prepare a polyimide with excellent mechanical and electrical properties. In addition, the amic acid ester oligomer of the present invention has a particular design of the structure and can be directly applied to an exposure and developing process in the absence of an acryloyloxy group. Therefore, there is no problem with respect to affecting physical properties of the polyimide by the residues of acryloyloxy groups.

SUMMARY OF THE INVENTION

An object of the present invention is to provide a new amic acid ester oligomer, which is not only applicable to a thermal imidization process, but also to a chemical imidization process.

Another object of the present invention is to provide a polyimide precursor composition comprising the amic acid ester oligomer.

A further object of the present invention is to provide a polyimide, which is prepared from the foregoing amic acid ester oligomer or precursor composition.

PREFERRED EMBODIMENT OF THE PRESENT INVENTION

In the present invention, the term "alkyl" refers to linear or branched saturated hydrocarbon groups, examples thereof including, but not limited to, methyl, ethyl, propyl (for example, n-propyl or isopropyl), butyl (for example, n-butyl, isobutyl or tert-butyl), pentyl, hexyl and the like. Unless otherwise specified, in the present invention the "alkyl" can be substituted or unsubstituted. The substituents include, for example, but not limited to, halogen, hydroxyl, —CN, $C_6$-$C_{14}$ aryl, 5- or 6-membered heterocyclyl group containing nitrogen and so on.

In the present invention, the term "aryl" refers to, for example, aromatic carbon ring systems of monocyclic ring, bicyclic ring or tricyclic ring having 6 to 14 carbon atoms, examples thereof including, but not limited to, phenyl, tolyl, naphthyl, fluorenyl, anthryl, phenanthryl and the like. Unless otherwise specified, in the present invention the "aryl" can be substituted or unsubstituted. The substituents include, for example, but not limited to, halogen, hydroxyl, —NO$_2$, alkyl and so on.

In the present invention, the term "arylalkyl" refers to a group constituted of an aryl and an alkyl. The group can be bonded to other group through the aryl or alkyl. Examples thereof include, but not limited to, 3-methylphenyl, 4-methylphenyl or the like. Unless otherwise specified, the "aryl" part and "alkyl" part can be substituted or unsubstituted. The substituents are such as those as described above.

In the present invention, the term "halogen" means fluorine, chlorine, bromine or iodine, preferably fluorine, chlorine or iodine.

The term "alkoxy" refers to —O-alkyl, examples thereof including, but not limited to, methoxy, ethoxy, propoxy, isopropoxy, n-butoxy, isobutoxy, tert-butoxy, pentyloxy, hexyloxy and the like. Unless otherwise specified, the "alkyl" part can be substituted or unsubstituted. The substituents are such as those as described above.

In the present invention, the term "heterocyclyl" refers to saturated, partially saturated (such as those named by dihydro-, trihydro-, tetrahydro- and hexahydro- in the prefix) or unsaturated 3- to 14-membered rings, preferably 4- to 10-membered rings, more preferably 5- to 6-membered rings, constituted of carbon atoms and at least one hetero atom selected from N, O or S. Preferably, it has 1 to 4 hetero atoms; more preferably, it has 1 to 3 hetero atoms. The heterocyclyl cover ring systems of monocyclic ring, bicyclic ring or tricyclic ring, which include fused rings (for example, a fused ring formed by a heterocyclyl together with another heterocyclyl or aromatic carbon ring). Unless otherwise specified, in the present invention, the "heterocyclyl" can be substituted or unsubstituted. The substituents include, for example, but not limited to, halogen, hydroxyl, oxo, alkyl, hydroxyalkyl, —NO$_2$ and so on.

In the present invention, the term "heterocyclyl group containing nitrogen" refers to a heterocyclyl in which at least one carbon atom of the ring is replaced by an N atom. Preferably, it is a 5- or 6-membered heterocyclyl group containing nitrogen.

I. Amic Acid Ester Oligomer and Preparation Method Therefor

The present invention provides a polyimide precursor, which is an amic acid ester oligomer of Formula (1) below:

(1)

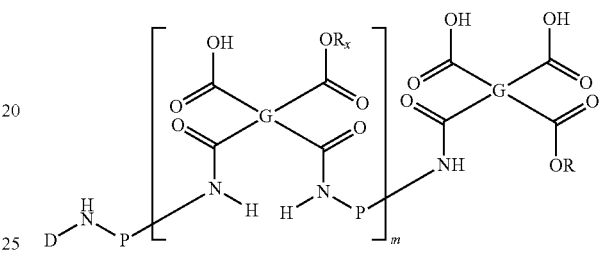

where

G is each independently a tetravalent organic group;

P is each independently a divalent organic group;

R is $C_1$-$C_{14}$ alkyl, $C_6$-$C_{14}$ aryl unsubstituted or substituted with one or more groups selected from hydroxyl and $C_1$-$C_4$ alkyl, or a group having an ethylenically unsaturated bond;

$R_x$ is each independently H, $C_1$-$C_8$ alkyl, or a group having an ethylenically unsaturated bond;

D is

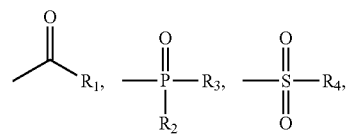

a 5- or 6-membered heterocyclyl group containing nitrogen substituted with $C_1$-$C_8$ alkyl, or a $C_1$-$C_8$ alkyl substituted with a 5- or 6-membered heterocyclyl group containing nitrogen;

wherein $R_1$ is H, $C_1$-$C_8$ haloalkyl, $C_1$-$C_8$ alkoxy substituted with one or more groups selected from $C_6$-$C_{14}$ aryl, a 5- or 6-membered heterocyclyl group containing nitrogen and cyano (—CN), $C_1$-$C_8$ haloalkoxy, or —NR$_5$R$_6$;

$R_2$ and $R_3$ are halo; and $R_4$ is methyl or

$R_5$ and $R_6$ may be the same or different, and are each independently H, or $C_6$-$C_{14}$ aryl unsubstituted or substituted with one or more alkyl groups; and m is an integer from 1 to 100, preferably an integer from 2 to 25, and more preferably an integer from 4 to 15. If m is too large, the resulting amic acid ester oligomer would have an overly large molecular weight, and have the drawbacks of a high viscosity unfavorable to the coating and a poor solubility unfavorable to the development process.

The present invention further provides a polyimide precursor, which is an amic acid ester oligomer of Formula (1') below:

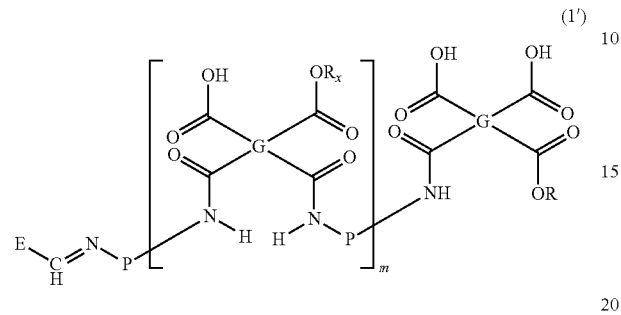
(1')

where
E is

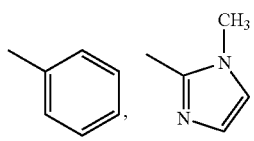

or —N(CH$_3$)$_2$; and
G, P, R, R$_x$ and m are as defined above.

The above-mentioned C$_1$-C$_{14}$ alkyl may be linear or branched, and is preferably methyl, ethyl, n-propyl, isopropyl, 1-methylpropyl, 2-methylpropyl (i.e. isobutyl), n-butyl, tert-butyl, 1-methylbutyl, 2-methylbutyl, pentyl, hexyl, heptyl, or octyl.

The above-mentioned group having an ethylenically unsaturated bond refers to a group having at least one C=C bond, and is preferably selected from the group consisting of ethenyl, propenyl, methylpropenyl, n-butenyl, iso-butenyl, ethenylphenyl, propenylphenyl, propenyloxymethyl, propenyloxyethyl, propenyloxypropyl, propenyloxybutyl, propenyloxypentyl, propenyloxyhexyl, methylpropenyloxymethyl, methylpropenyloxyethyl, methylpropenyloxypropyl, methylpropenyloxybutyl, methylpropenyloxypentyl, methylpropenyloxyhexyl, and a group of Formula (2):

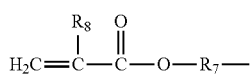
(2)

where R$_7$ is phenylene, C$_1$-C$_8$ alkylene, C$_2$-C$_8$ alkenylene, C$_3$-C$_8$ cycloalkylene, C$_1$-C$_8$ hydroxyalkylene, or

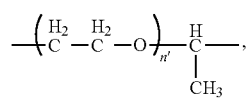

in which n' is an integer of 1 to 4; and R$_8$ is hydrogen or C$_1$-C$_4$ alkyl.

The above-mentioned C$_6$-C$_{14}$ aryl is preferably

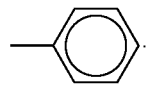

According to a preferred embodiment of the present invention, R is selected from:

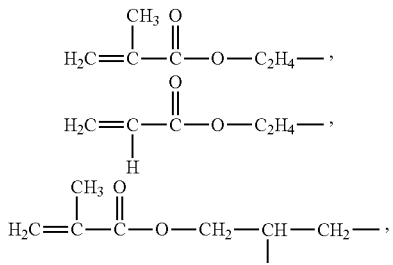

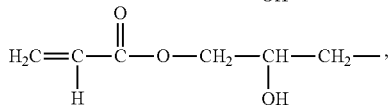

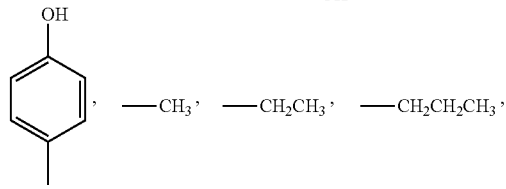

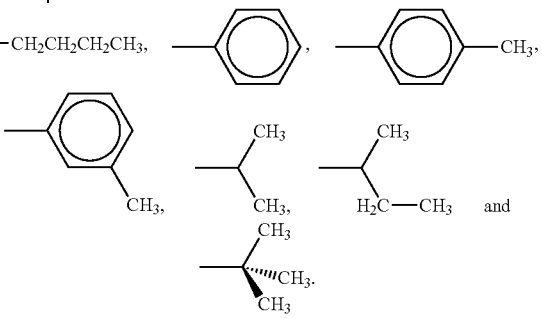

According to a preferred embodiment of the present invention, the group R$_x$ is preferably each independently H, methyl, ethyl, propyl, butyl, 2-hydroxypropyl methacrylate, ethyl methacrylate, ethyl acrylate, propenyl, methylpropenyl, n-butenyl, or iso-butenyl. More preferably, R$_x$ is each independently H or a group of

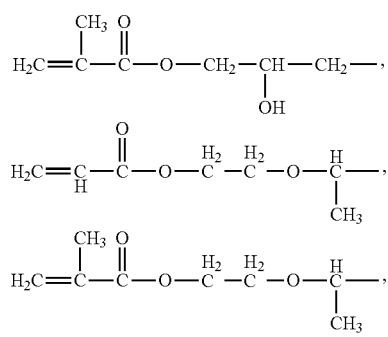

-continued

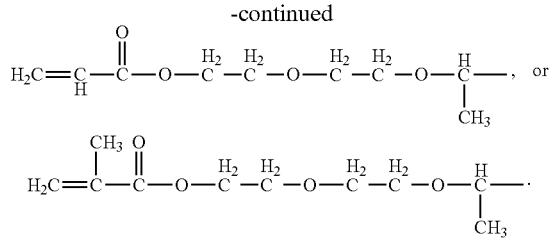

In the present invention, the tetravalent organic group G can be a tetravalent aromatic group, a tetravalent cycloalkyl group, a tetravalent heterocyclyl group or an analogue thereof. Preferably, G is each independently:

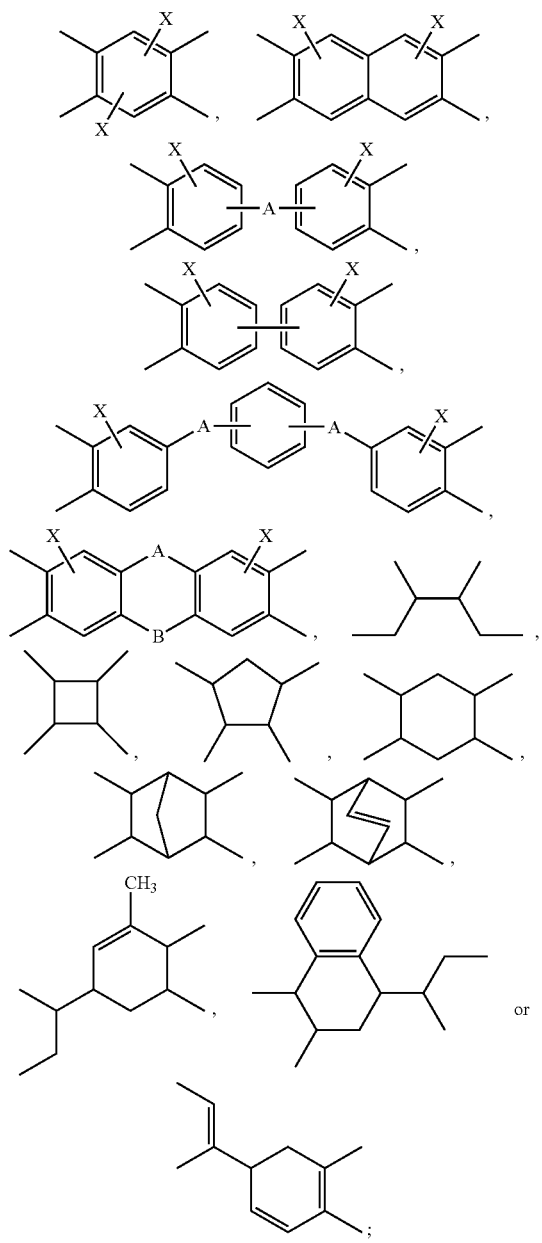

wherein X is each independently hydrogen, halo, $C_1$-$C_4$ perfluoroalkyl, or $C_1$-$C_4$ alkyl; and A and B at each occurrence are each independently a covalent bond, $C_1$-$C_4$ alkylene unsubstituted or substituted with one or more groups selected from hydroxyl and $C_1$-$C_4$ alkyl, $C_1$-$C_4$ perfluoroalkylene, $C_1$-$C_4$ alkyleneoxy, silylene, —O—, —S—, —C(O)—, —OC(O)—, —S(O)$_2$—, —C(=O)O—($C_1$-$C_4$ alkylene)-OC(=O)—, —CONH—, phenyl, biphenylyl, or

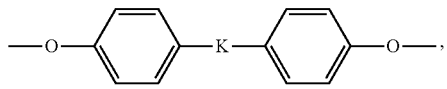

wherein K is —O—, —S(O)$_2$—, $C_1$-$C_4$ alkylene (such as methylene, ethylene or —C(CH$_3$)$_2$—) or $C_1$-$C_4$ perfluoroalkylene (such as perfluoromethylene, perfluoromethylene or —C(CF$_3$)$_2$—).

Preferably, the tetravalent organic group G is each independently selected from a group consisting of:

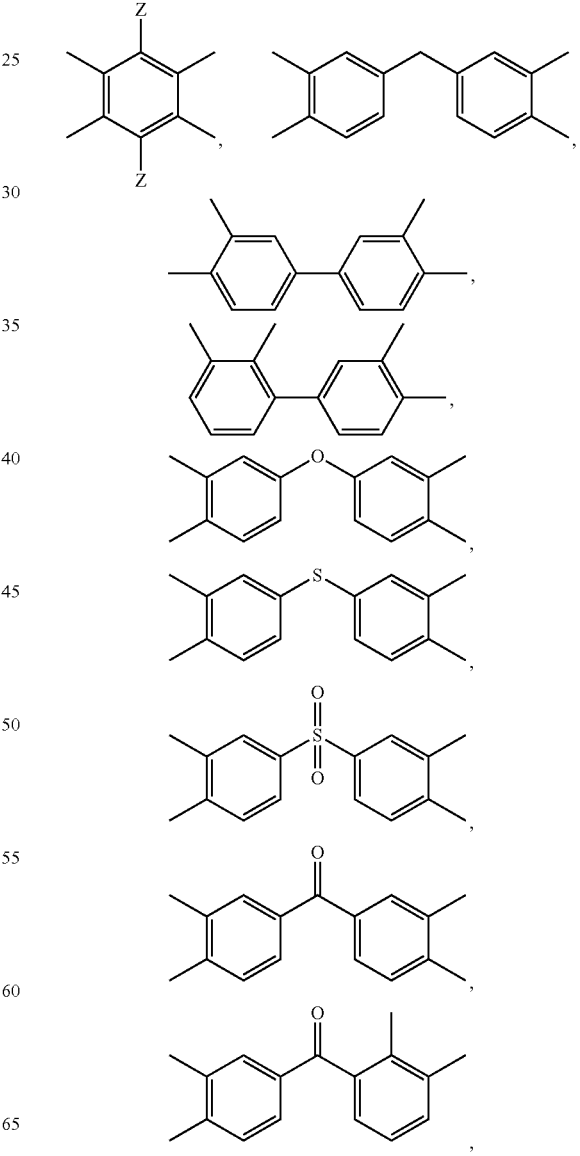

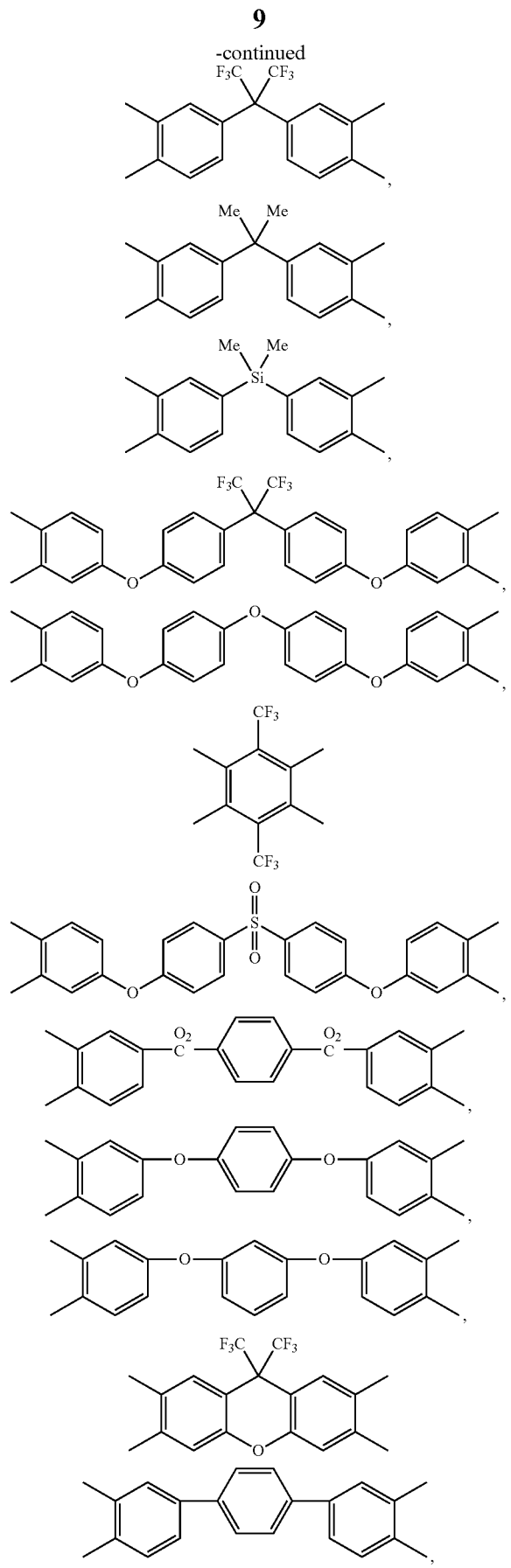
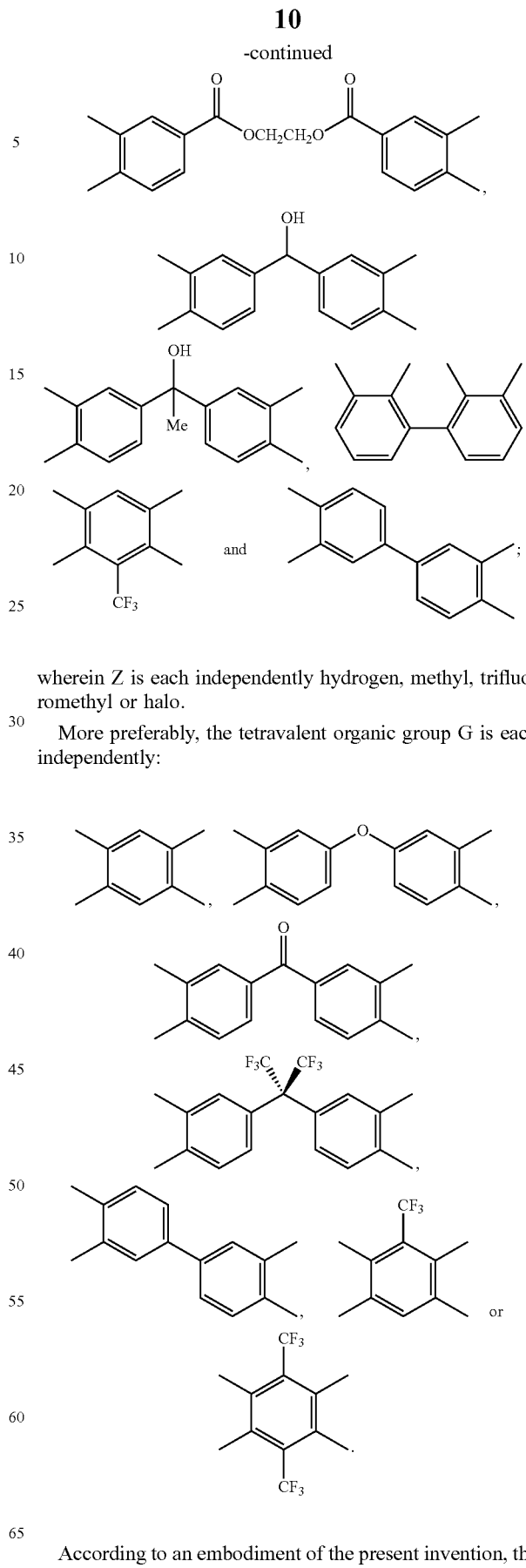
wherein Z is each independently hydrogen, methyl, trifluoromethyl or halo.
More preferably, the tetravalent organic group G is each independently:
According to an embodiment of the present invention, the tetravalent organic group G is

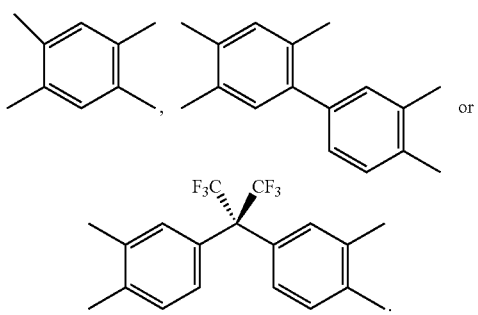

In the present invention, the divalent organic group P is not particularly limited. In general, the divalent organic group P can each independently be a divalent aromatic group, a divalent cycloalkyl group, a divalent heterocyclyl group or a divalent group containing siloxane. P is for example but not limited to:

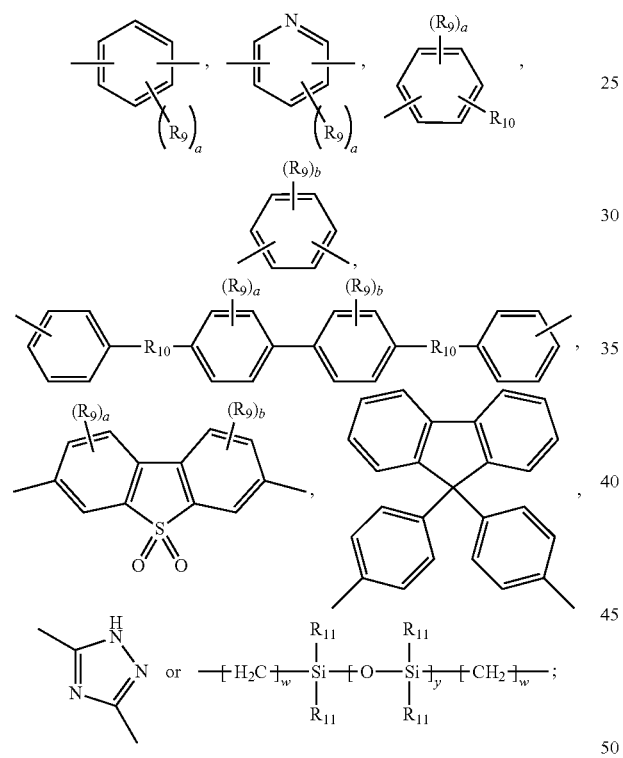

wherein:
$R_9$ is each independently H, $C_1$-$C_4$ alkyl, $C_1$-$C_4$ perfluoroalkyl, $C_1$-$C_4$ alkoxy, halo, —OH, —COOH, —$NH_2$ or —SH;
a is each independently an integer from 0 to 4;
b is each independently an integer from 0 to 4; and
$R_{10}$ is a covalent bond or a group selected from the group consisting of:

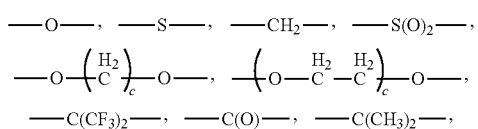

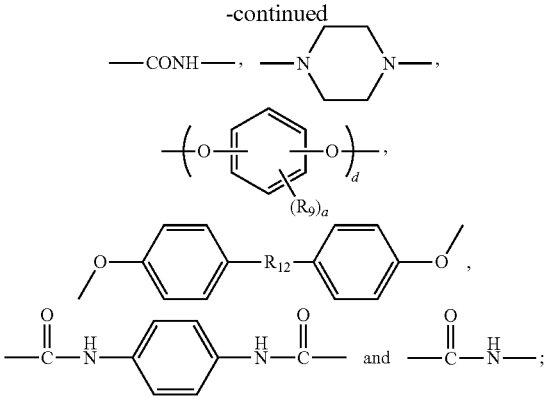

wherein
c and d are each independently an integer from 1 to 20;
$R_{12}$ is —$S(O)_2$—, —C(O)—, a covalent group, $C_1$-$C_4$ alkyl or $C_1$-$C_4$ perfluoroalkyl; $R_9$ and a are as defined above;
$R_{11}$ is each independently hydrogen, halo, phenyl, $C_1$-$C_4$ alkyl, or $C_1$-$C_4$ perfluoroalkyl; and
w and y are each an integer from 1 to 3.

Preferably, the divalent organic group P is each independently:

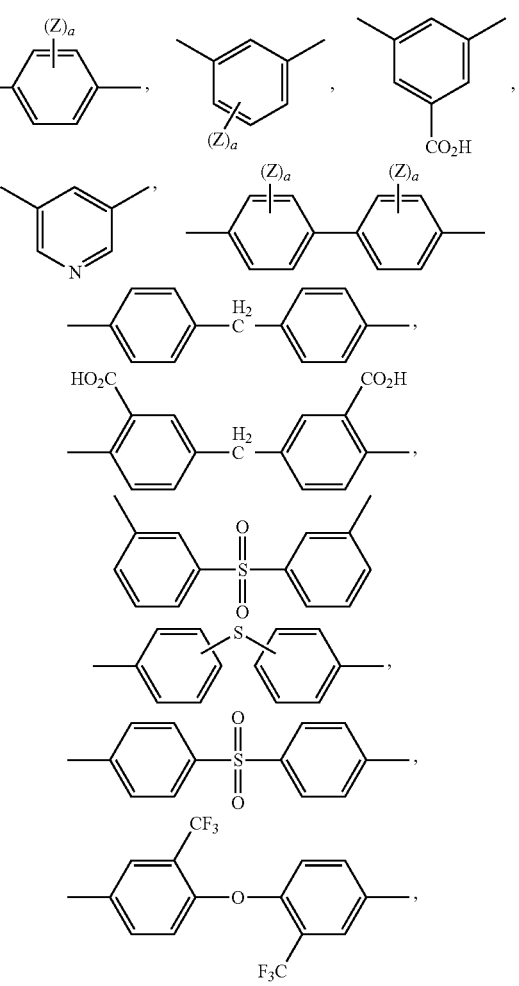

-continued
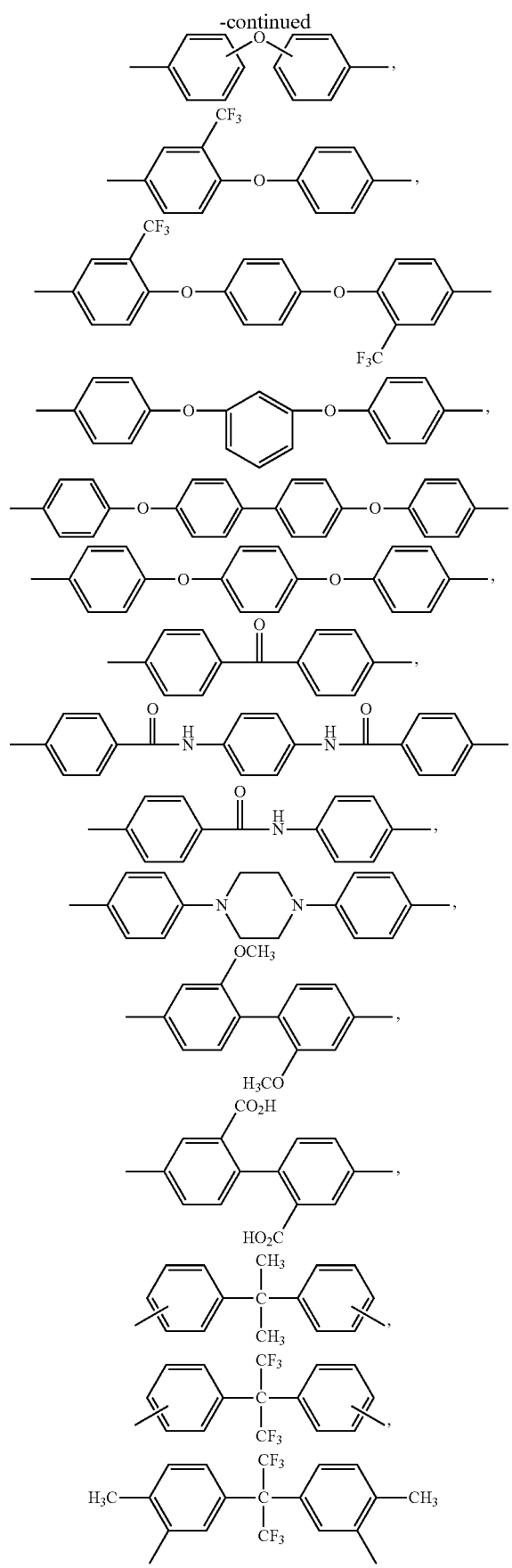
-continued
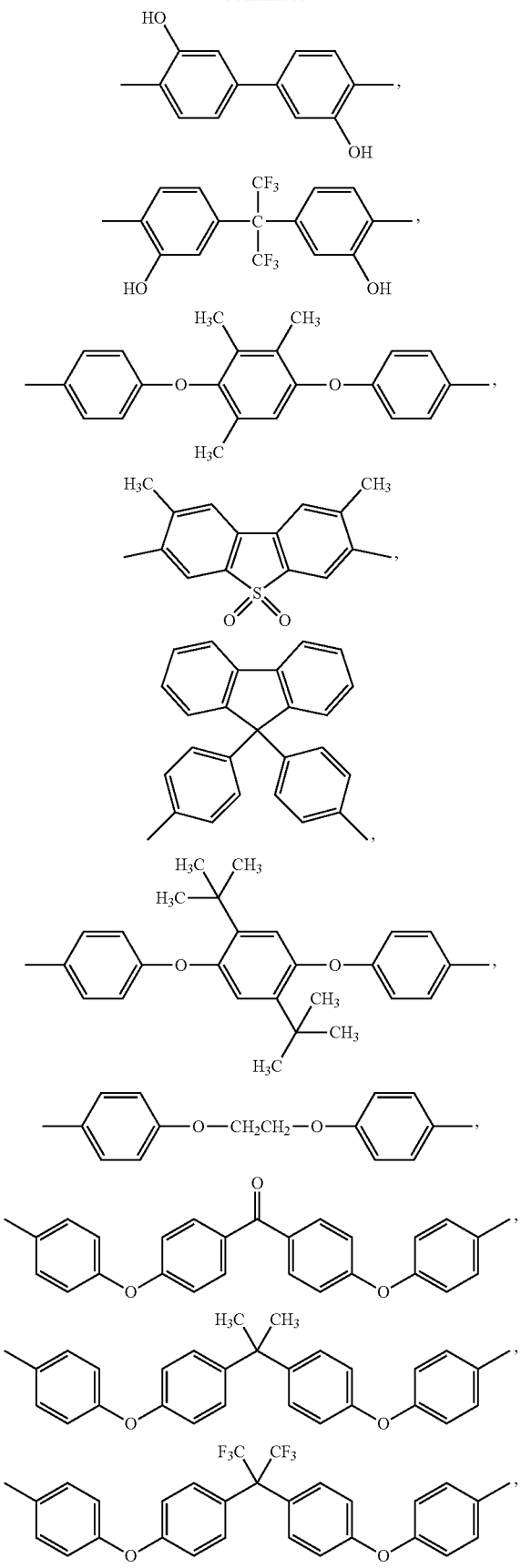

15
-continued

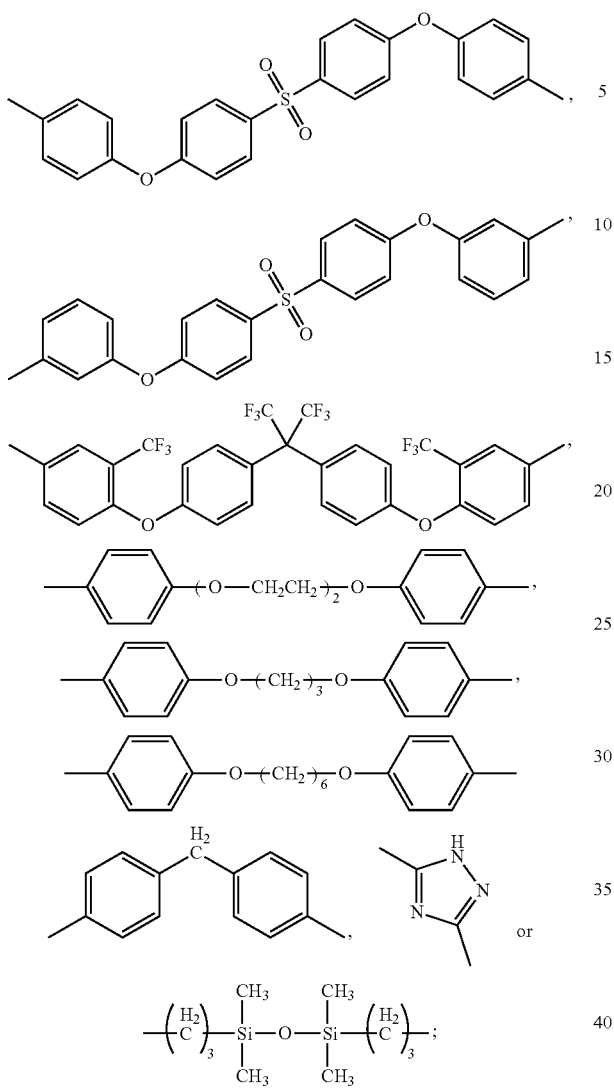

wherein:

a is each independently an integer from 0 to 4; and

Z is each independently hydrogen, methyl, trifluoromethyl or halo.

More preferably, the divalent organic group P is each independently:

16
-continued

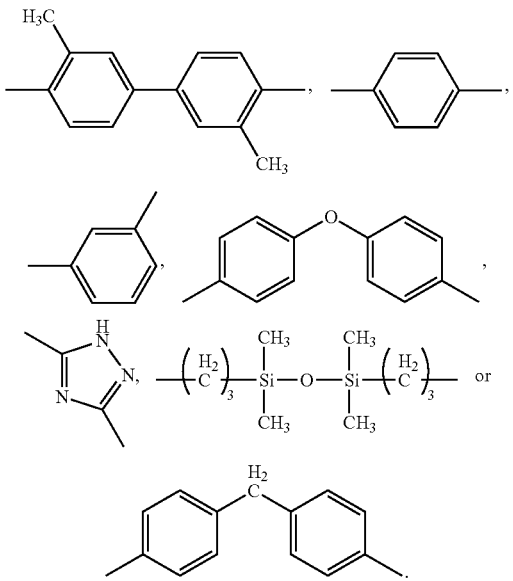

In an embodiment of the present invention, the above-mentioned divalent organic group P is

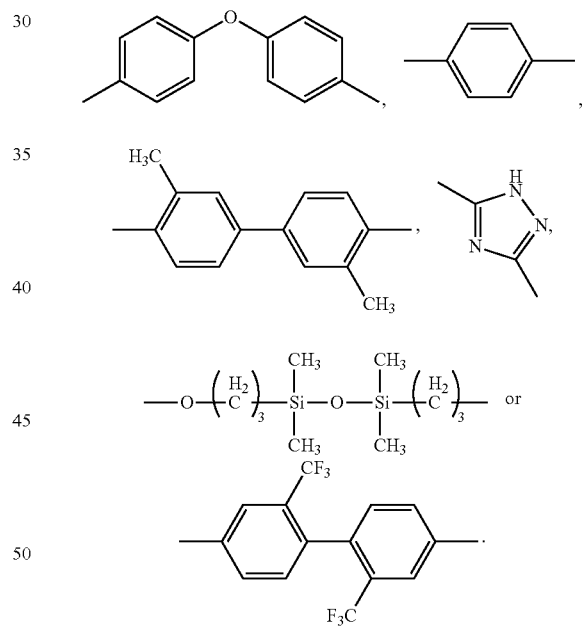

According to an embodiment of the present invention, the substituent D contained in the amic acid ester oligomer of Formula (1) is

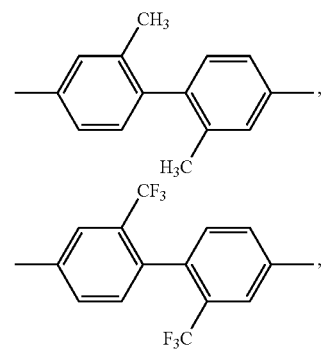

in which $R_1$ is H, trifluoromethyl, pentafluoroethyl,

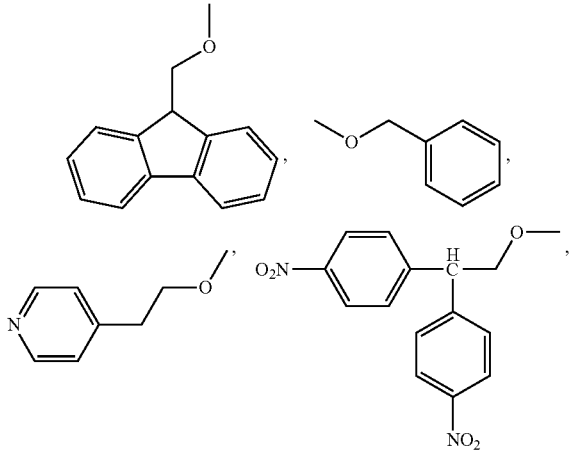

—NHPh  or  —NHCH$_3$.

According to another embodiment of the present invention, the substituent D contained in the amic acid ester oligomer of Formula (1) is

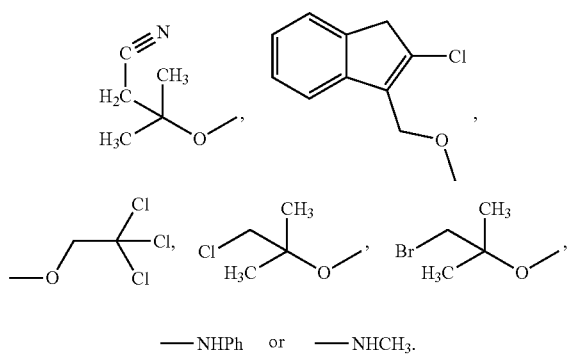

in which $R_2$ and $R_3$ are each independently —F or —Cl, and $R_4$ is methyl or

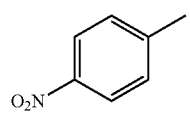

According to another embodiment of the present invention, the substituent D contained in the amic acid ester oligomer of Formula (1) is a 5- or 6-membered heterocyclyl group containing nitrogen substituted with $C_1$-$C_8$ alkyl, for example

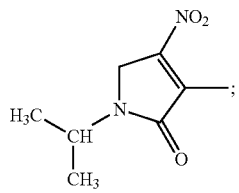

or a $C_1$-$C_8$ alkyl substituted with a 5- or 6-membered heterocyclyl group containing nitrogen, for example

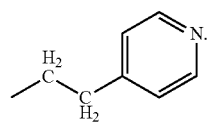

According to a specific embodiment of the present invention, D is selected from the group consisting of:

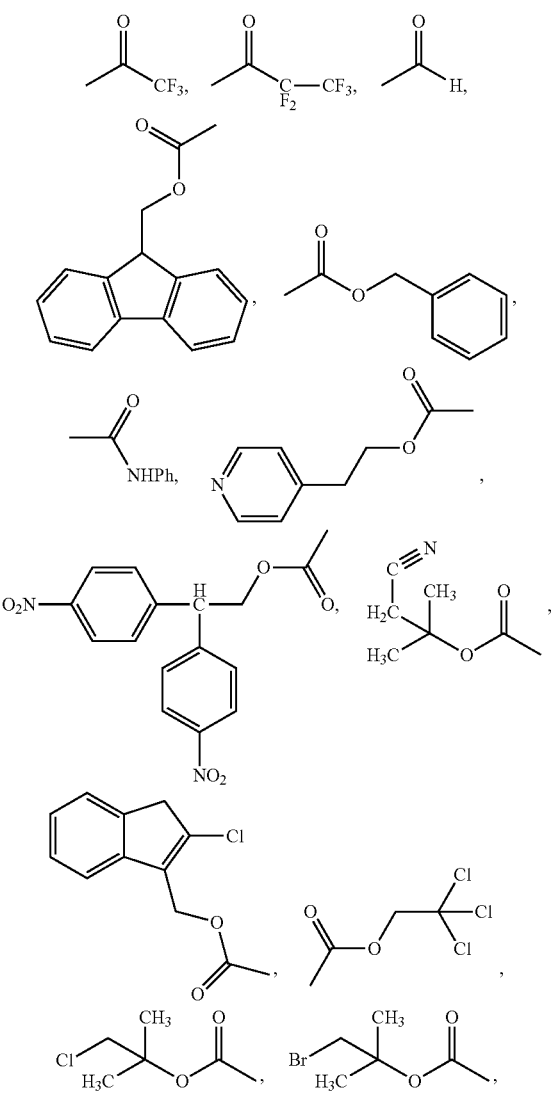

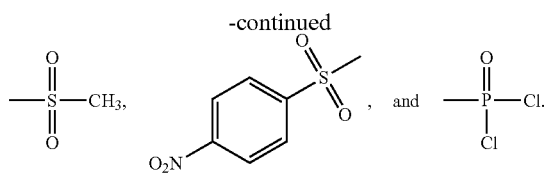

D is preferably

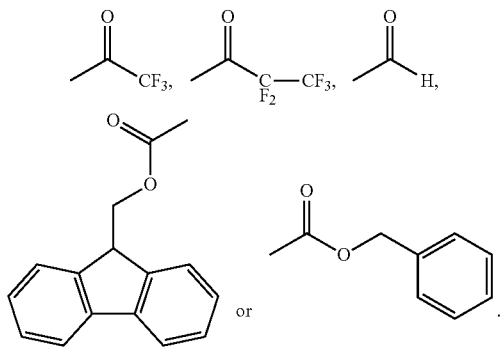

According to an embodiment of the present invention, the substituent E contained in the amic acid ester oligomer of Formula (1') is phenyl or

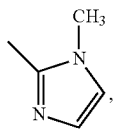

and preferably

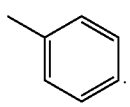

Preparation Method

The amic acid ester oligomer of the present invention may be prepared through, without limitation, a method comprising:

(a) reacting a dianhydride of Formula (6) with a compound with a hydroxyl group (R—OH) in the presence of a solvent such as N-methylpyrrolidone (NMP), to form a compound of Formula (7):

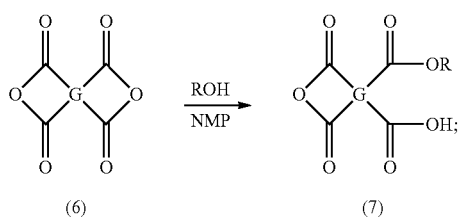

(b) adding a diamine compound ($H_2N$—P—$NH_2$) and the dianhydride of Formula (6) to the product obtained in the step (a), to form an amic acid ester oligomer of Formula (8):

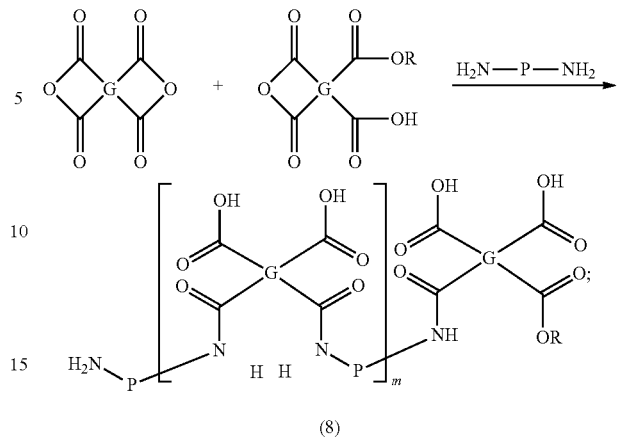

and (c) adding a compound bearing the above-mentioned group D or E, and reacting it with the amic acid ester oligomer of Formula (8), to form an amic acid ester oligomer of Formula (5) or (5'):

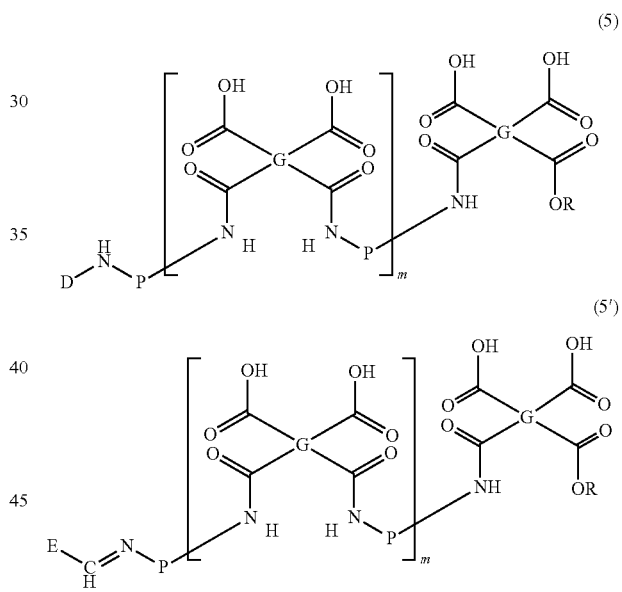

(d) optionally adding one or more compounds having the group ($R_x$), for example, epoxy acrylate, and carrying out the reaction to form an amic acid ester oligomer of Formula (1) or (1'):

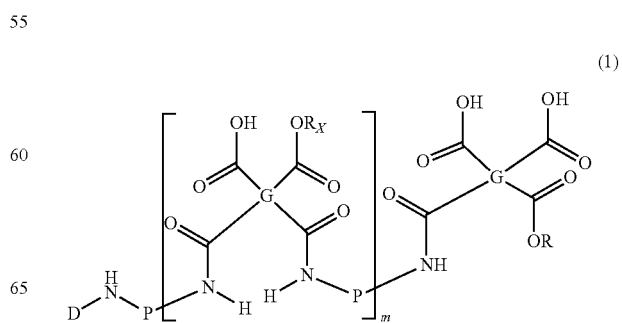

-continued

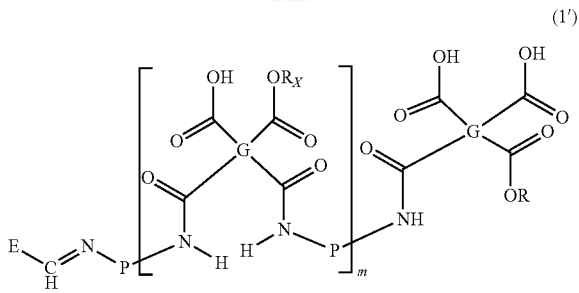
(1')

where G, P, R, $R_x$, D, E and m are as defined herein above.

The dianhydride used in step (a) can be aliphatic or aromatic, and is preferably aromatic. The examples of an aromatic dianhydride include, but are not limited to, pyromellitic dianhydride (PMDA), 4,4'-biphthalic dianhydride (BPDA), 4,4-hexafluoroisopropylidenediphthalic dianhydride (6FDA), 1-(trifluoromethyl)-2,3,5,6-benzenetetracarboxylic dianhydride (P3FDA), benzophenone-tetracarboxylic dianhydride (BTDA), 3,3',4,4'-oxydiphthalic dianhydride (ODPA), 1,4-bis(trifluoromethyl)-2,3,5,6-benzenetetracarboxylic dianhydride (P6FDA), 1-(3',4'-dicarboxyphenyl)-1,3,3-trimethylindan-5,6-dicarboxylic dianhydride, 1-(3',4'-dicarboxyphenyl)-1,3,3-trimethylindan-6,7-dicarboxylic dianhydride, 1-(3',4'-dicarboxyphenyl)-3-methylindan-5,6-dicarboxylic dianhydride, 1-(3',4'-dicarboxyphenyl)-3-methylindan-6,7-dicarboxylic dianhydride, 2,3,9,10-perylenetetracarboxylic dianhydride, 1,4,5,8-naphthalenetetracarboxylic dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-2,4,5,8-tetracarboxylic dianhydride, phenanthrene-1,8,9,10-tetracarboxylic dianhydride, 3,3',4,4'-benzophenonetetracarboxylic dianhydride, 1,2',3,3'-benzophenonetetracarboxylic dianhydride, 3,3',4,4'-biphenyltetracarboxylic dianhydride, 3,3',4,4'-benzophenonetetracarboxylic dianhydride, 2,2',3,3'-biphenyltetracarboxylic dianhydride, 4,4'-isopropylidenediphthalic anhydride, 3,3'-isopropylidenediphthalic anhydride, 4,4'-oxydiphthalic anhydride, 4,4'-sulfonyldiphthalic anhydride, 3,3'-oxydiphthalic anhydride, 4,4'-methylenediphthalic anhydride, 4,4'-thiodiphthalic anhydride, 4,4'-ethlidenediphthalic anhydride, 2,3,6,7-naphthalenetetracarboxylic dianhydride, 1,2,4,5-naphthalenetetracarboxylic dianhydride, 1,2,5,6-naphthalenetetracarboxylic dianhydride, benzene-1,2,3,4-tetracarboxylic dianhydride, pyridine-2,3,5,6-tetracarboxylic dianhydride, and a mixture thereof.

Preferably, the aromatic dianhydride used in step (a) is selected from the group consisting of pyromellitic dianhydride (PMDA), 4,4'-biphthalic anhydride (BPDA), 4,4'-hexafluoroisopropylidenediphthalic dianhydride (6FDA), 1-(trifluoromethyl)-2,3,5,6-benzenetetracarboxylic dianhydride (P3FDA), 1,4-bis(trifluoromethyl)-2,3,5,6-benzenetetracarboxylic dianhydride (P6FDA), benzophenonetetracarboxylic dianhydride (BTDA), 3,3',4,4'-oxydiphthalic anhydride (ODPA), and a mixture thereof. In one embodiment, pyromellitic dianhydride (PMDA) is used.

The compound having a hydroxyl group used in step (a) can be an alcohol, such as a mono-ol, a diol, or a polyol, preferably a mono-ol. The mono-ol useful in the present invention is not particularly limited and can be an alkanol, an aralkanol, or an arylol. The mono-ol can be (but is not limited to) a linear or branched alkanol with 1 to 14 carbon atoms, such as but not limited to, methanol, ethanol, n-propanol, isopropanol, 1-methylpropanol, n-butanol, isobutanol, neobutanol, 1-methylbutanol, 2-methylbutanol, pentanol, hexanol, heptanal, and octanol. The mono-ol useful in the present invention can also be an aralkanol or arylol with 6 to 14 carbon atoms, such as but not limited to, phenol, m-cresol or p-cresol.

The above-mentioned compound having a hydroxyl group used in the process of the present invention can also bear a photosensitive group, such as a group having an ethylenically unsaturated bond as mentioned above. Preferably, the compound has the following Formula (10):

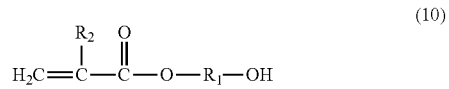
(10)

wherein $R_7$ and $R_8$ are those as defined above. Preferably, the compound of Formula (10) is selected from the group consisting of 2-hydroxyethyl acrylate (HEA), 2-hydroxyethyl methacrylate (HEMA), and a mixture thereof.

The diamine used in step (b) is not particularly limited and can be an aromatic diamine. The aromatic diamines useful in the process of the present invention are well known to persons having ordinary skill in the art. For example, the aromatic diamine can be selected from, but is not limited to, the following group: 4,4'-oxy-dianiline (ODA), para-phenylenediamine (pPDA), 2,2-dimethyl-4,4-diamino-biphenyl (DMDB), 2,2'-bis(trifluoromethyl) benzidine (TFMB), o-tolidine (oTLD), 4,4'-octafluorobenzidine (OFB), tetrafluorophenylenediamine (TFPD), 2,2',5,5'-tetrachlorobenzidine (TCB), 3,3'-dichlorobenzidine (DCB), 2,2'-bis(3-aminophenyl)hexafluoropropane, 2,2'-bis(4-aminophenyl)hexafluoropropane, 4,4'-oxo-bis(3-trifluoromethyl)aniline, 3,5-diaminobenzotrifluoride, tetrafluorophenylene diamine, tetrafluoro-m-phenylene diamine, 1,4-bis(4-aminophenoxy-2-tert-butylbenzene (BATB), 2,2'-dimethyl-4,4'-bis(4-aminophenoxy)biphenyl (DBAPB), 2,2-bis[4-(4-aminophenoxy)phenyl]hexafluoropropane (BAPPH), 2,2'-bis[4-(4-aminophenoxy)phenyl]norborane (BAPN), 5-amino-1-(4'-aminophenyl)-1,3,3-trimethylindane, 6-amino-1-(4'-aminophenyl)-1,3,3-trimethylindane, 4,4'-methylenebis(o-chloroaniline), 3,3'-dichlorobenzidine, 3,3'-sulfonyldianiline, 4,4'-diaminobenzophenone, 1,5-diaminonaphthalene, bis(4-aminophenyl)diethyl silane, bis(4-aminophenyl)diphenyl silane, bis(4-aminophenyl)ethyl phosphine oxide, N-(bis(4-aminophenyl)-N-methyl amine, N-(bis(4-aminophenyl))-N-phenyl amine, 4,4'-methylenebis(2-methylaniline), 4,4'-methylenebis(2-methoxyaniline), 5,5'-methylenebis(2-aminophenol), 4,4'-methylenebis(2-methylaniline), 4,4'-oxybis(2-methoxyaniline), 4,4'-oxybis(2-chloroaniline), 2,2'-bis(4-aminophenol), 5,5'-oxybis(2-aminophenol), 4,4'-thiobis(2-methylaniline), 4,4'-thiobis(2-methoxyaniline), 4,4'-thiobis(2-chloroaniline), 4,4'-sulfonylbis(2-methylaniline), 4,4'-sulfonylbis(2-ethoxyaniline), 4,4'-sulfonylbis(2-chloroaniline), 5,5'-sulfonylbis(2-aminophenol), 3,3'-dimethyl-4,4'-diaminobenzophenone, 3,3'-dimethoxy-4,4'-diaminobenzophenone, 3,3'-dichloro-4,4'-diaminobenzophenone, 4,4'-diaminobiphenyl, m-phenylenediamine, 4,4'-methylenedianiline (MDA), 4,4'-thiodianiline, 4,4'-sulfonyldianiline, 4,4'-isopropylidenedianiline, 3,3'-dimethoxybenzidine, 3,3'-dicarboxybenzidine, 2,4-tolyl-diamine, 2,5-tolyl-diamine, 2,6-tolyl-diamine, m-xylyldiamine, 2,4-diamino-5-chloro-toluene, 2,4-diamino-6-chloro-toluene, and a mixture thereof. Preferably, the diamine is 4,4'-oxy-dianiline (ODA), para-phenylenediamine (pPDA), 2,2-dimethyl-4,4-diamino-biphenyl (DMDB), 2,2'-bis(trifluoromethyl)benzidine (TFMB), o-tolidine (oTLD), 4,4'-methylenedianiline (MDA), 3,5-diamino-1,2,4-triazole or a mixture thereof.

Preferably, the diamine used in step (b) is selected from the group consisting of:

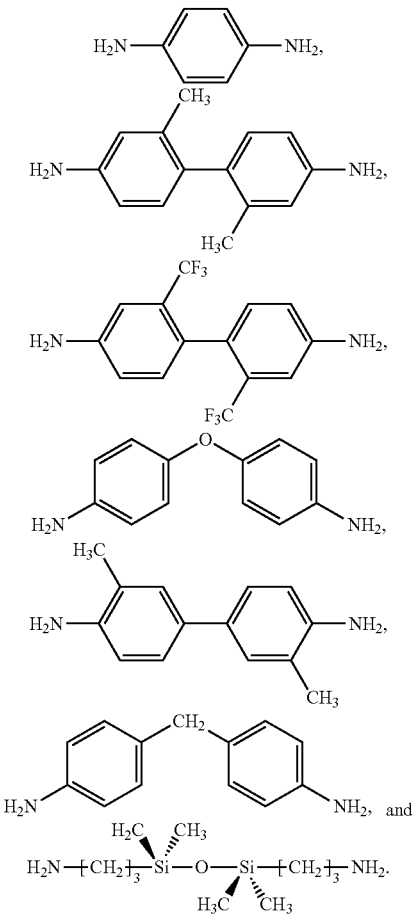

The compound bearing the group D or E used in the step (c) may be any compound bearing the above-mentioned group D or E and capable of reacting with the terminal amino group of the amic acid ester oligomer of Formula (8), for example, but not limited to, trifluoroacetic acid anhydride (TFAA), benzaldehyde,

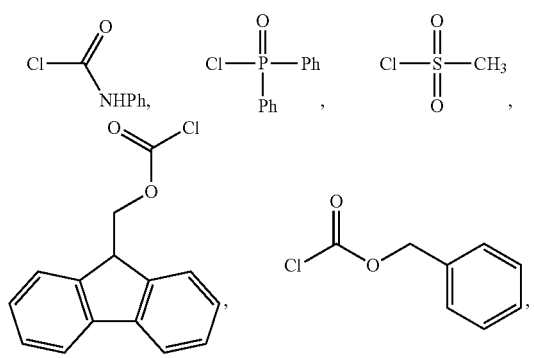

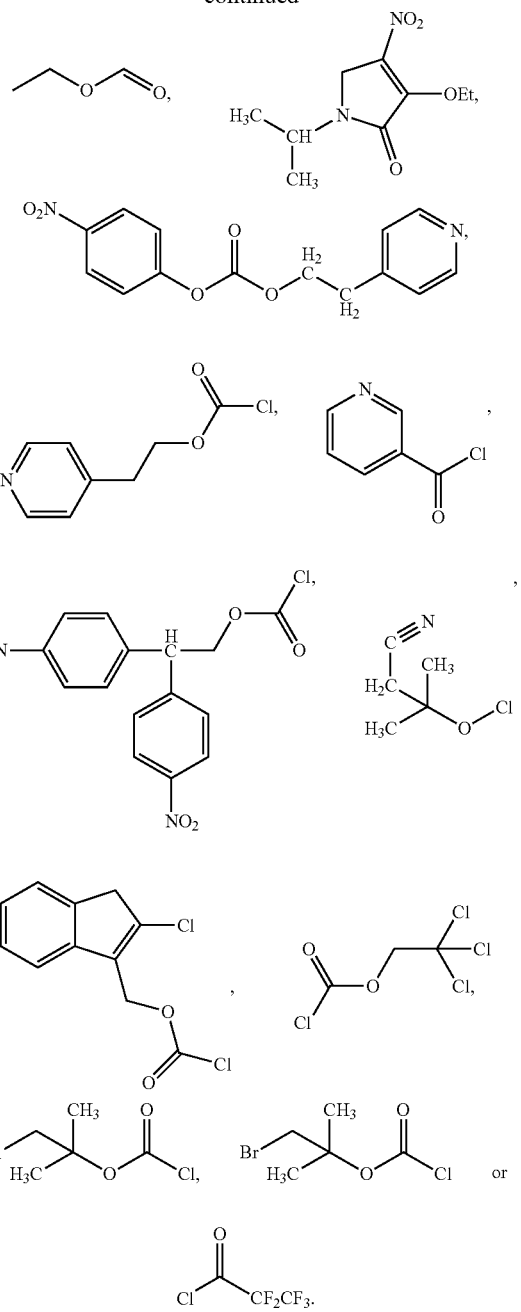

During the long-term storage at room temperature, a few amino groups in the amic acid ester oligomers of Formula (8) may react with the terminal groups at the other end, causing an elevated viscosity and thus poor operability. Further, the terminal amino group of the amic acid ester oligomer is prone to react with a dehydrating agent. To solve the above problems, in the step (c) of the present invention, the compound bearing the group D or E serves as a protectant, and reacts with the terminal amino group of the compound of Formula (8), to form a terminal group that is stable at room temperature and does not react with a dehydrating agent.

In case that trifluoroacetic acid anhydride is used as a protectant, the reaction scheme is as follows:

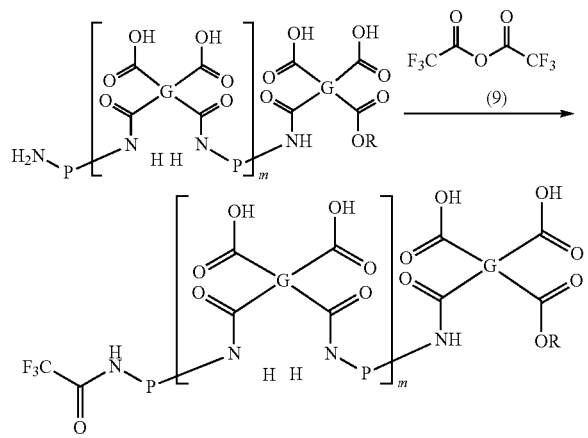

In case that

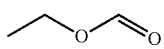

is used as a protectant, the reaction scheme is as follows:

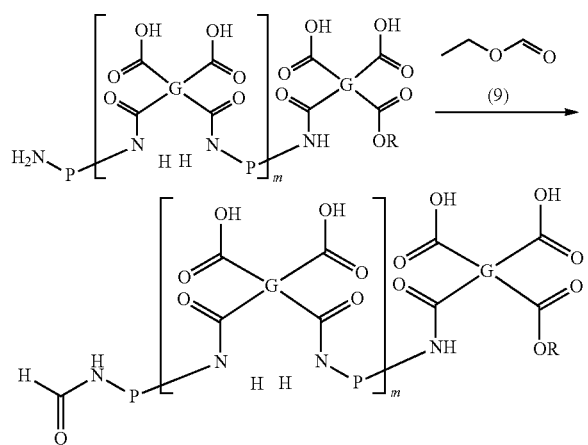

In case that benzaldehyde is used as a protectant, the reaction scheme is as follows:

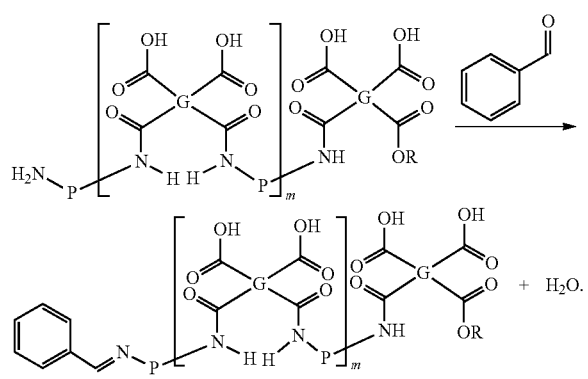

Since the amic acid ester oligomer of Formula (8) has a terminal amino group and the nitrogen atom on the amino group contains a lone electron pair, the amic acid ester oligomer of Formula (8) can act as a nucleophilic reagent. If a chemical imidization process is directly employed, the amic acid ester oligomer of Formula (8) may react with a positively charged carbon atom, and thus react with a dehydrating agent (such as acetic anhydride), and is acylated, etc., causing that the amic acid ester oligomer cannot be further polymerized into a polyimide of high molecular weight. To solve this technical problem, the present inventors found through research that the terminal amino group of the amic acid ester oligomer of Formula (8) may be modified with a particular group D or E, to provide a temporary protection for preventing the terminal amino group of the amic acid ester oligomer from reacting with a dehydrating agent. The amic acid ester oligomer of Formula (1) or (1') obtained in the present invention has a particular aminoprotecting group D or E at the end, such that the reactivity at room temperature decreases, and no reaction with the terminal ester group (—COOR) and carboxyl group (—COOH) of Formula (8) or a dehydrating agent occurs. In addition, the group D or E can be removed in a subsequent heating process, such that the amic acid ester oligomer of Formula (1) or (1') has improved storage stability and can be cyclized and polymerized by chemical imidization, to form a polyimide having excellent thermal, mechanical and tensile properties. Furthermore, the hard bake temperature of the polyimide can be further reduced by using chemical imidization.

The amic acid ester oligomer of Formula (1) or (1') prepared in the present invention has an ester group (—COOR) and a carboxyl group (—COOH) at one end, and an amino group substituted with a particular group D or E at the other end, and experiences no polymerization and cyclization at room temperature or even a higher temperature of 50-90° C. However, when the temperature is elevated, the group D or E is removed and $—NH_2$ is formed through reduction. Then, polymerization occurs to further form a larger polymer, which is then condensed to provide a polyimide having excellent thermal, mechanical and tensile properties. The amic acid ester oligomer of Formula (1) or (1') of the present invention has a small viscosity, and thus a high leveling performance and a good operability upon coating. The amic acid ester oligomer of Formula (1) or (1') of the present invention has good storage stability, and a polyimide precursor composition comprising the amic acid ester oligomer of Formula (1) or (1') is not only applicable to a thermal imidization process, but also more suitable for use with a chemical imidization process. Compared with the thermal imidization process, the chemical imidization process can be performed at a lower temperature, the process is rapid, and the film forming performance is good. In addition, the group D or E in the amic acid ester oligomer of Formula (1) or (1') provided in the present invention has a particular design. Under a basic condition, the group D or E is facilitated to be removed and $—NH_2$ is formed through reduction. Therefore, a photobase generator may be added to and directly used in the exposure and development process, thereby effectively solving the problem existing in the prior art.

II. Polyimide Precursor Composition

The present invention further provides a polyimide precursor composition, which comprises an amic acid ester oligomer of Formula (1) or (1') and a solvent. The polyimide precursor composition may be a photosensitive polyimide precursor composition or a non-photosensitive polyimide precursor composition.

The solvent used in the composition of the present invention is preferably a polar aprotic solvent. For example and without limitation, the solvent can be selected from the group consisting of dimethyl sulfoxide (DMSO), diethyl sulfoxide, N,N-dimethyl formamide (DMF), N,N-diethyl formamide, N,N-dimethyl acetamide (DMAc), N,N-diethyl acetamide, N-methyl-2-pyrrolidone (NMP), N-ethyl-2-pyrrolidone (NEP), N-octyl-2-pyrrolidone (NOP), N,N-dimethylcapramide, phenol, o-cresol, m-cresol, p-cresol, xylenol, halogenated phenol, catechol, tetrahydrofuran (THF), dioxane, dioxolane, propylene glycol methyl ether (PGME), tetraethylene glycol dimethyl ether (TGDE), methanol, ethanol, butanol, butylcellosolve, γ-butyrolactone (GBL), xylene, toluene, hexamethyl phosphoramide, propylene glycol methyl ether acetate (PGMEA), and a mixture thereof. The solvent is preferably a solvent selected from the group consisting of dimethyl sulfoxide (DMSO), diethyl sulfoxide, N,N-dimethyl formamide (DMF), N,N-diethyl formamide N,N-dimethylacetamide (DMAc), N,N-diethyl acetamide, N-methyl-2-pyrrolidone (NMP), N-ethyl-2-pyrrolidone (NEP), N-octyl-2-pyrrolidone (NOP), N,N-dimethylcapramide, and γ-butyrolactone (GBL). In the polyimide precursor composition according to the present invention, the content of the amic acid ester oligomer is 15 to 70% and preferably 25 to 60%, and the content of the solvent is 30 to 85% and preferably 40 to 75%, based on the total weight of the composition.

An alkaline environment can facilitate the removal of the group D or E at the end of the amic acid ester oligomer of Formula (1) or (1') and facilitate the cyclization and polymerization of the amic acid ester oligomer into a polyimide. However, if a basic compound is directly added to the composition, it would result in reduced storage stability and other drawbacks. Therefore, the polyimide precursor composition of the present invention may optionally comprise a thermal base generator or a photobase generator, which releases a basic compound upon heating or irradiation.

For example, when a thermal base generator is added, a basic compound is released from the thermal base generator by heating for 5-180 min at, for example, about 50-250° C., whereby the group D or E at the end of the amic acid ester oligomer of Formula (1) or (1') is removed, and cyclization and polymerization occur to form a polyimide. Compared with the thermal imidization at a high temperature of 300-350° C. in the prior art, the amic acid ester oligomer is allowed to be imidized at a lower heating temperature by adding a thermal base generator to the polyimide precursor composition of the present invention, and thus the preparation process is advantageous.

The thermal base generator used in the present invention has, for example, but not limited to, the structure of Formula (C):

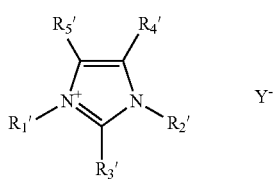

(C)

wherein $R_1'$ and $R_2'$ are the same or different and are each independently H, $C_1$-$C_6$ alkyl, $C_1$-$C_6$ haloalkyl, or $C_1$-$C_6$ alkyl substituted or with one or more $C_6$-$C_{14}$ aryl, or

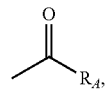

wherein $R_A$ is $C_1$-$C_6$ alkyl, $C_1$-$C_6$ haloalkyl, $C_1$-$C_8$ alkoxy unsubstituted or substituted with one or more $C_6$-$C_{14}$ aryl, or —$NR_ER_F$, and $R_E$ and $R_F$ are the same or different, and are each independently H, linear or branched $C_1$-$C_{14}$ alkyl unsubstituted or substituted with one or more $C_6$-$C_{14}$ aryl, or $C_6$-$C_{14}$ aryl; $R_3'$, $R_4'$ and $R_5'$ are the same or different, and are each independently H, $C_1$-$C_6$ alkyl unsubstituted or substituted with one or more $C_6$-$C_{14}$ aryl, $C_1$-$C_6$ hydroxyalkyl, $C_1$-$C_6$ cyanoalkyl, or $C_6$-$C_{14}$ aryl; and $Y^-$ is an anionic group.

According to an embodiment of the present invention, the groups $R_1'$ and $R_2'$ in Formula (C) are the same or different and are each independently $C_1$-$C_6$ alkyl, or

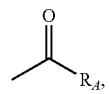

wherein $R_A$ is $C_1$-$C_6$ alkyl, $C_1$-$C_6$ haloalkyl, $C_1$-$C_8$ alkoxy unsubstituted or substituted with one or more $C_6$-$C_{14}$ aryl, or —$NR_ER_F$. Preferably, $R_A$ is methyl, ethyl, n-propyl, isopropyl, n-butyl, isobutyl, tert-butyl, pentyl, hexyl, trifluoromethyl, pentafluoethyl, methoxy, ethoxy, propoxy, butoxy, pentyloxy, hexyloxy, benzyloxy or fluorenylmethoxy.

According to an embodiment of the present invention, the groups $R_1'$ and $R_2'$ in Formula (C) are the same or different and are each independently methyl, ethyl, propyl, butyl or selected from a group consisting of:

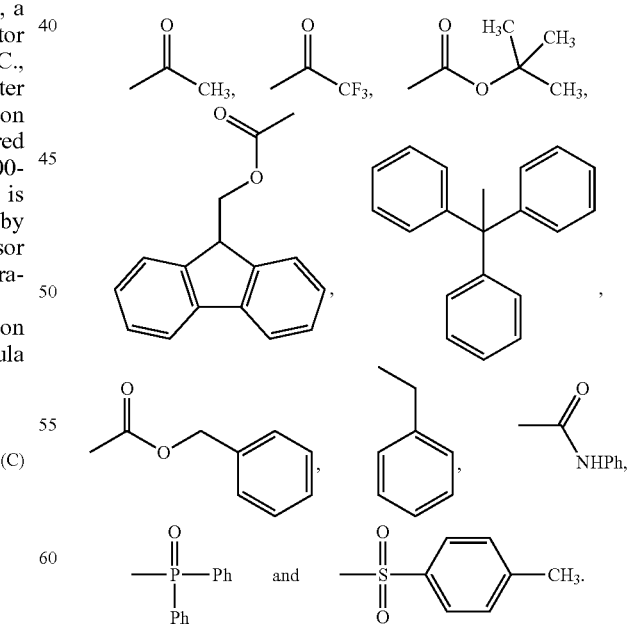

Preferably, $R_1'$ and $R_2'$ are the same or different and are each independently methyl, ethyl or selected from a group consisting of:

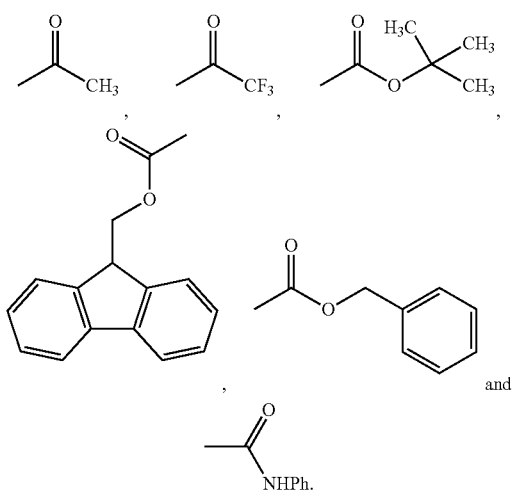

According to an embodiment of the present invention, $R_3'$, $R_4'$ and $R_5'$ in Formula (C) are the same or different and are each independently H, methyl, ethyl, n-propyl, isopropyl, n-butyl, isobutyl, tert-butyl, pentyl, hexyl, hydroxymethyl, hydroxyethyl, hydroxypropyl, hydroxybutyl, hydroxypentyl, hydroxyhexyl, cyanomethyl, cyanoethyl, cyanopropyl, cyanobutyl, cyanopentyl, cyanohexyl, phenyl, benzyl or diphenylmethyl; preferably, hydroxybutyl is

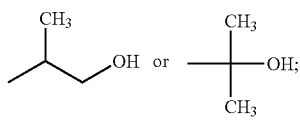

preferably, hydroxypentyl is

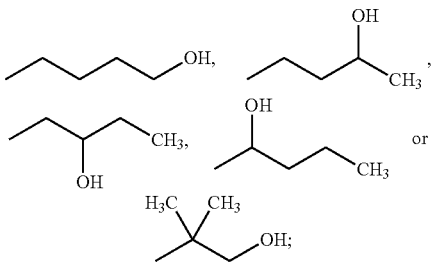

preferably, cyanobutyl is

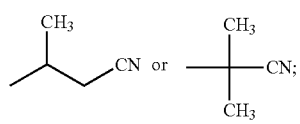

and preferably, cyanopentyl is

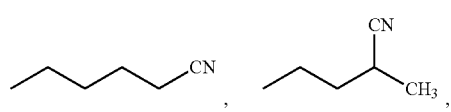

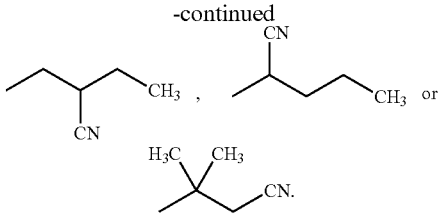

Preferably, $R_3'$, $R_4'$ and $R_5'$ are the same or different and are each independently H, methyl, ethyl, n-propyl or isopropyl.

The anionic group in Formula (C) is not particularly limited, examples thereof including, but not limited to, halide ion, sulfate, nitrate, phosphate, sulfonate, carbonate, tetrafluoborate, borate, chlorate, iodate, hexafluorophosphate, perchlorate, trifluoromethanesulfonate, trifluoroacetate, acetate, tert-butylcarbonate, $(CF_3SO_2)_2N^-$ or tert-butyloxy. According to an embodiment of the present invention, the anionic group in Formula (C) is halide ion or tetrafluoborate. Preferably, the halide ion is fluoride ion and chloride ion.

In addition to Formula (C), the thermal base generator used in the present invention also can be

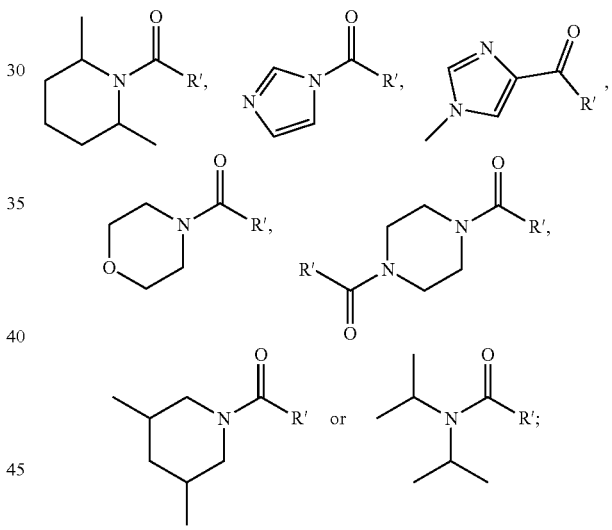

wherein R' is $C_1$-$C_6$ alkyl or $C_1$-$C_6$ alkyloxy and the above-mentioned groups can be optionally substituted with one or more halogen atom or phenyl. Preferably, is R' is —$CF_3$ or —O-tbu.

Preferably, the thermal base generator is:

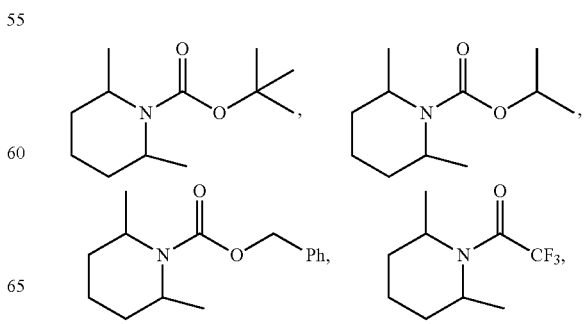

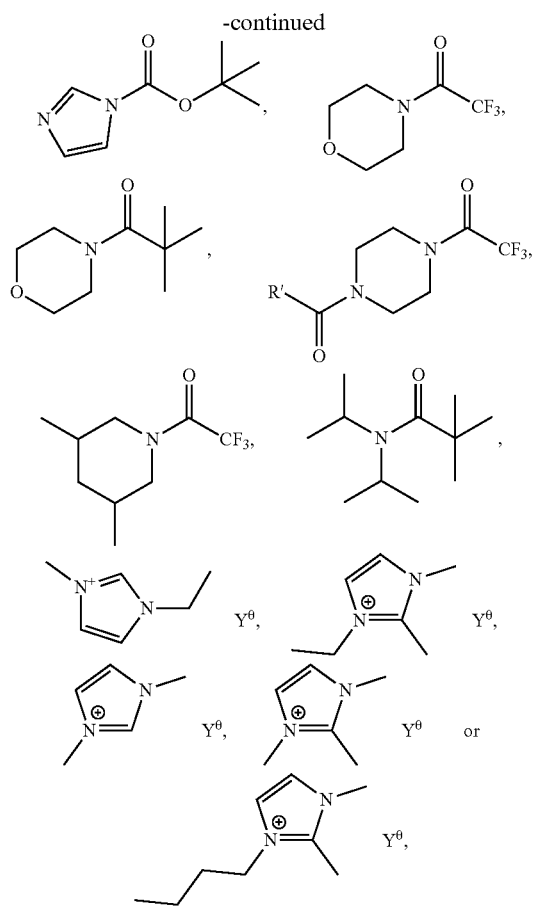

wherein Y⁻ is an anionic group as described above.

In the polyimide precursor composition according to the present invention, the content of the thermal base generator is about 0.5 to about 10 parts by weight and preferably about 2 to 5 parts by weight based on 100 parts by weight of the amic acid ester oligomer.

The polyimide precursor composition according to the present invention may optionally comprise any additive known to those of ordinary skill in the art for preparing polyimides, for example, but not limited to, a leveling agent, an anti-forming agent, a coupling agent, a dehydrating agent, a catalyst, a photoinitiator, and a co-initiator. The content of the additives can also be adjusted by persons of ordinary skill in the art through routine experiments.

The suitable photoinitiator in the present invention can be selected from the group consisting of, without limitation, benzophenone, benzoin, 2-hydroxy-2-methyl-1-phenyl propanone, 2,2-dimethoxy-1,2-diphenylethan-1-one, 1-hydroxy-cyclohexyl-phenyl ketone, 2,4,6-trimethylbenzoyl diphenyl phosphine oxide, or a combination thereof.

The coupling agent useful in the present invention may selected from a group consisting of, without limitation, 3-aminopropyltrimethoxysilane (APrTMOS), 3-triaminopropyltriethoxysilane (APrTEOS), 3-aminophenyltrimethoxysilane (APTMOS), 3-aminophenyltriethoxysilane (APTEOS), and a combination thereof.

III. Photosensitive Polyimide Precursor Composition

According to an embodiment of the present invention, the polyimide precursor composition of the present invention is a photosensitive polyimide precursor composition comprising the above-mentioned amic acid ester oligomer of Formula (1) or (1'), and a solvent.

A photosensitive polyimide (PSPI) is imparted with photosensitivity by incorporating a photosensitive group (R*) (e.g. acryloyloxy) to the structure of a polyimide or a precursor thereof. In a subsequent process for synthesizing the polyimide, crosslinking is achieved by intermolecular chemical linking, causing the difference between solubilities of exposed and non-exposed regions. Nevertheless, such a photosensitive group affects the desired properties of polyimide, and therefore, it needs to be removed after exposure. However, the compounds containing a photosensitive group generally have a high boiling point. For example, compounds containing acryloyloxy group typically have a boiling point of up to 250° C. If such photosensitive polyimides are used in the manufacturing process of semiconductors, a high hard bake temperature is required.

According to another embodiment of the present invention, the polyimide precursor composition of the present invention is a photosensitive polyimide precursor composition comprising the above-mentioned amic acid ester oligomer of Formula (1) or (1'), a solvent, and a photobase generator. The amic acid ester oligomer of Formula (1) or (1') used in the present invention may contain no photosensitive group (R*). By adding a photobase generator, the amic acid ester oligomer is allowed to undergo a polymerization and ring-closing reaction, causing the difference between solubilities of exposed and non-exposed regions. Therefore, an exposure and developing process can be directly used in the absence of a photosensitive group, and there is no problem with respect to affecting physical properties of the polyimide by the residues of photosensitive groups.

The photobase generator used in the present invention is decomposed upon irradiation to release a basic compound, whereby a suitable alkaline environment is provided, which facilitates the cyclization and polymerization of the amic acid ester oligomer to form a polyimide. The photobase generator may be any suitable conventional photobase generator. The photobase generator preferably has a pKa of 6 or less before irradiation, and the compound released after irradiation has a pKa of 8 or higher. The photobase generator is, for example, but not limited to the following compounds or an analogue thereof:

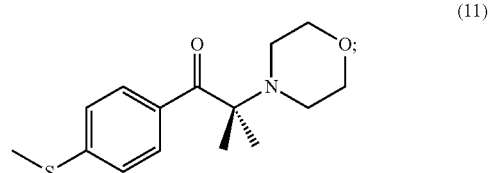

(11)

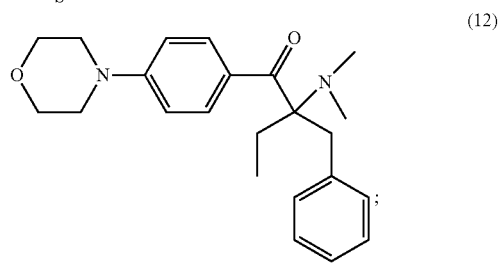

(12)

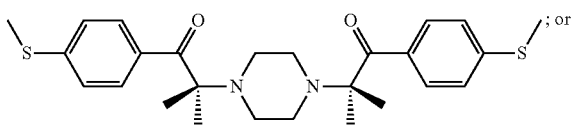

(13)

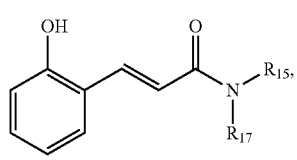

(14)

in which R₁₇ is methyl or ethyl, and R₁₅ is methyl, ethyl, propyl, phenyl, benzyl,

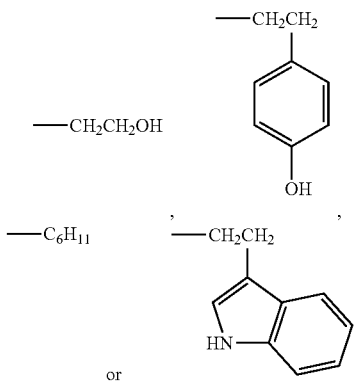

The products produced after irradiation of the compounds of Formulas (11) to (14) have a low boiling point, and can be removed conveniently, thus being particularly suitable for use as a photobase generator in the present invention.

For example, the reaction scheme of the compound of Formula (11) being decomposed upon irradiation to release a basic compound is as follows:

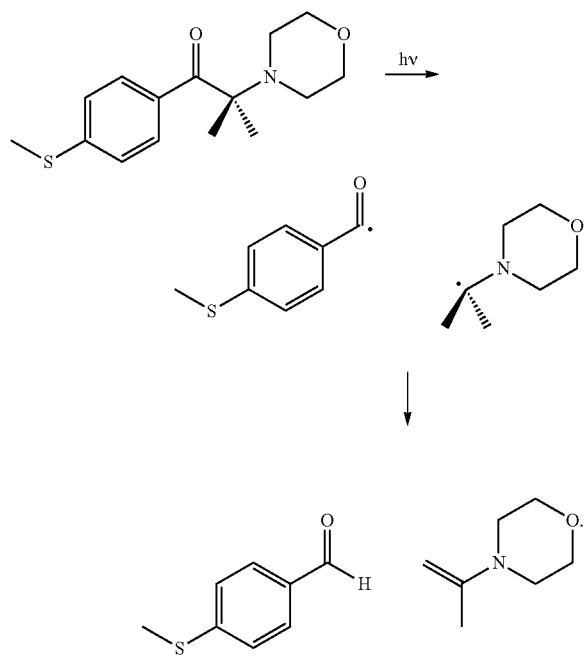

For example, the reaction scheme of the compound of Formula (14) being to decomposed upon irradiation to release a basic compound is as follows:

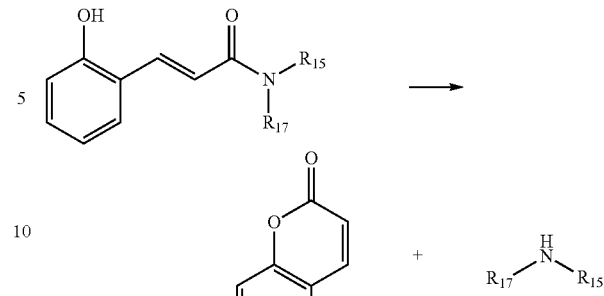

The solvent contained in the photosensitive polyimide precursor composition of the present invention may include a polar aprotic solvent that is preferably a type as described above.

In the photosensitive polyimide precursor composition according to the present invention, the content of the photobase generator is about 0.5 to about 20 parts by weight and preferably about 2 to 10 parts by weight based on 100 parts by weight of the amic acid ester oligomer.

The photosensitive polyimide precursor composition according to the present invention may also optionally comprise any additive and/or thermal base generator known to those of ordinary skill in the art for preparing polyimides, in which the types of the additive and the thermal base generator are as described above.

According to another preferred embodiment of the present invention, the photosensitive polyimide precursor composition of the present invention comprises the amic acid ester oligomer of Formula (1) or (1'), a photobase generator, a thermal base generator, and a solvent. The photobase generator can facilitate the development by light sensing, produce an alkali upon irradiation such that the protecting group is removed, and promote the ring-closing and polymerization reaction. The addition of the thermal base generator can reduce the cyclization temperature, and further facilitate the subsequent ring-closing reaction for forming a polyimide. In a preferred embodiment of the present invention, the content of the photobase generator is about 0.5 to about 20 parts by weight and preferably about 2 to 10 parts by weight, and the content of the thermal base generator is about 0.5 to about 10 parts by weight and preferably about 2 to about 5 parts by weight, based on 100 parts by weight of the amic acid ester oligomer.

IV. Method for Preparing Polyimide and Process for Patterning

The present invention provides a polyimide prepared from the polyimide precursor composition or the photosensitive polyimide precursor composition as described above.

1. Preparation of Polyimide Through a Thermal Imidization Process or Chemical Imidization Process A polyimide can be prepared from the polyimide precursor composition of the present invention through a thermal imidization process or a chemical imidization process.

For example and without limitation, without being bound by any theory, when a thermal imidization process is adopted and the polyimide precursor composition of the present invention is used for preparing a polyimide, the possible reaction mechanism is as follows:

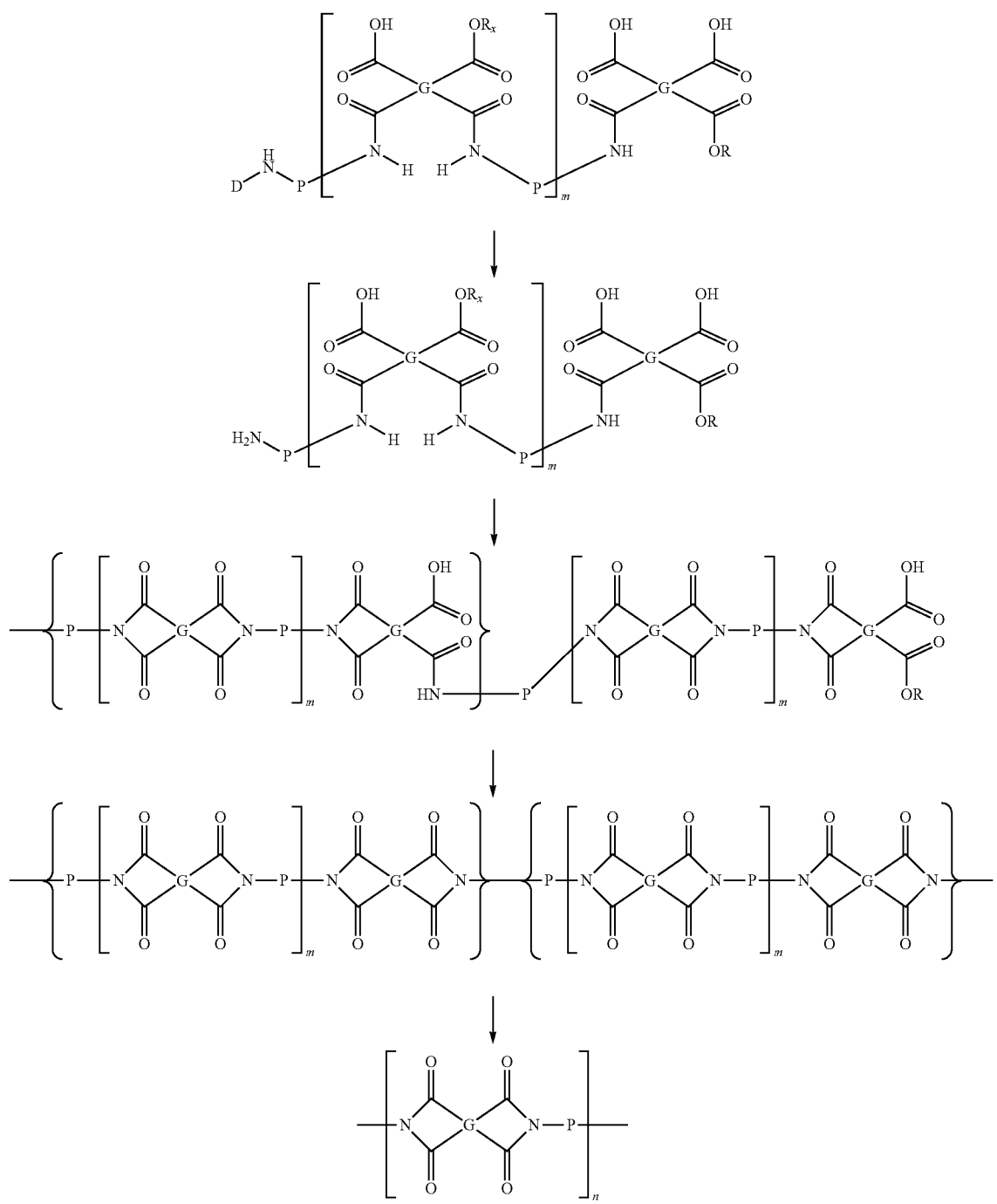

where m is as defined above and n is an integer of >500.

For example, in a thermal imidization process, the polyimide precursor composition of the present invention is heated at a ramping temperature of 5° C./min up to about 200° C., then kept for 1 hr, and further heated to 300° C. and kept for 2 hrs, to prepare a polyimide.

For example, in a chemical imidization process, the polyimide precursor composition containing a thermal base generator of the present invention is heated at a ramping temperature of 5° C./min up to about 200° C., then kept for 1 hr, and further heated to 250° C. and kept for 2 hrs, to prepare a polyimide.

2. Use of the Photosensitive Polyimide Precursor Composition of the Present Invention in a Patterning Process The photosensitive polyimide precursor composition of the present invention can be used in a patterning process, and the amic acid ester oligomer of Formula (1) or (1') is polymerized and cyclized into a polyimide after an irradiation and heating step.

Taking the photosensitive polyimide precursor composition containing a photobase generator as an example, the method for preparing a polyimide may comprise:

(I) irradiating the photosensitive polyimide precursor composition of the present invention to decompose the photobase generator to release a basic compound, thus providing an alkaline environment; and (II) optionally heating in the alkaline environment to remove the group D or E on the terminal amino group of the amic acid ester oligomer of Formula (1) or (1'); and further heating (at 70-150° C. for 5-30 min) to allow cyclization and partial polymerization, to form a polyimide;

(III) developing; and (IV) finally cyclizing at a high temperature 250-350° C. for 0.5-3 hrs) and polymerizing to form a patterned polyimide.

By taking the amic acid ester oligomer of Formula (1) as an example, a possible reaction scheme of the steps (II) to (IV) is as follows.

Removal of Group D at the Terminal Amino Group

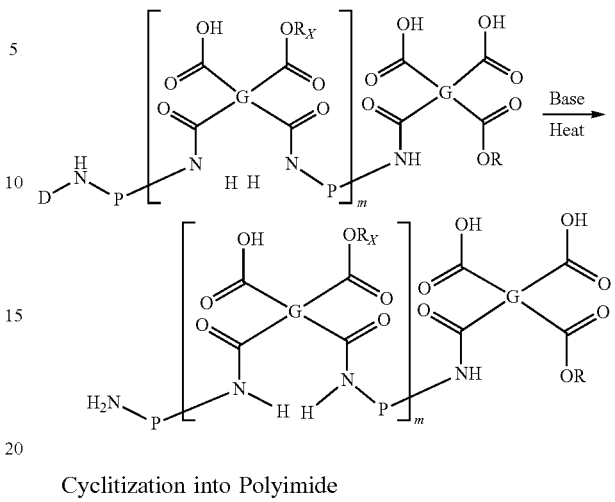

Cyclitization into Polyimide

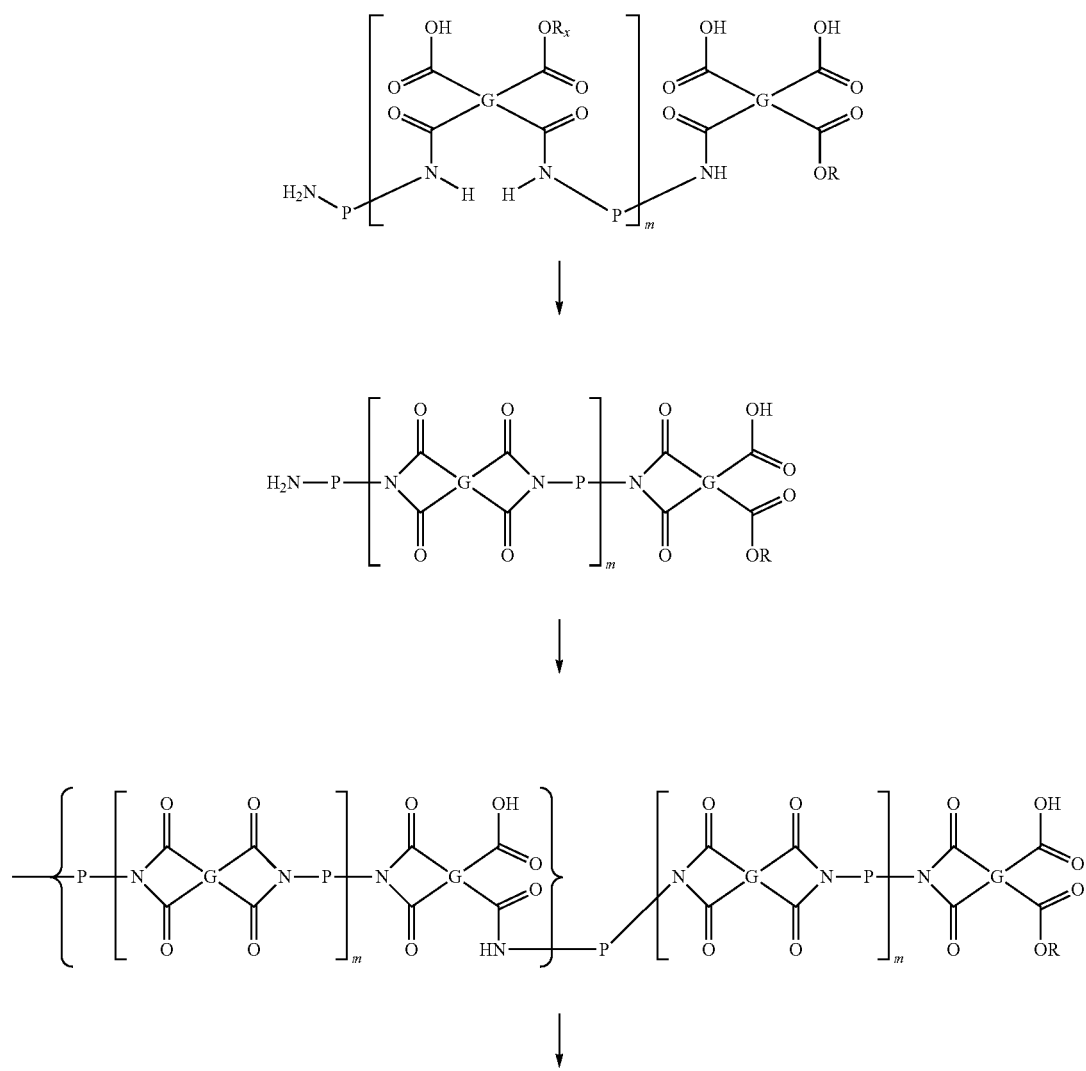

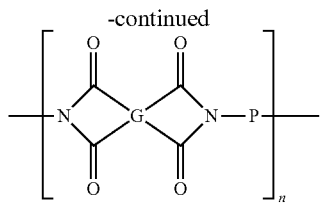

where m is as defined above and n is an integer of >500.

The photosensitive polyimide precursor composition of the present invention has photosensitivity due to the presence of a photobase generator or a combination of a photobase generator and a thermal base generator, and can be used in a photoresist, a buffer layer of a semiconductor, a redistribution layer of an IC package and a coverlay, in place of the conventional photosensitive polyimide. The photobase generator is decomposed upon irradiation to release a basic compound, whereby a suitable alkaline environment is provided, which facilitates the removal of the group D or E from the amic acid ester oligomer, and facilitates the cyclization and polymerization of the amic acid ester oligomer into a polyimide.

The photosensitive polyimide precursor composition of the present invention has photosensitivity. Due to the cyclization and partial polymerization of the amic acid ester oligomer in the exposed region, there is a difference between the solubilities of the composition in the exposed and non-exposed regions after exposure, whereby the composition in the exposed region can be removed, leaving an intended pattern. Therefore, the photosensitive polyimide precursor composition of the present invention is particularly applicable to a patterning process. In addition, by virtue of the above features, a photoresist layer does not needed to be additionally applied when the photosensitive polyimide precursor composition of the present invention is used. Thus, the process steps can be reduced, the line deformation caused by removal of the photoresist layer in the conventional patterning process can be avoided, and the yield of the patterning process is improved.

For example and without limitation, the photosensitive polyimide precursor composition of the present invention can be coated onto, for example, a polyethylene terephthalate (PET) thin film. After being baked to form a film, it is transferred and laminated to a copper clad laminate, and then developed by exposure to obtain an intended pattern. And the amic acid ester oligomer is polymerized and imidized to prepare a polyimide coverlay with excellent performances.

The steps of coating and baking to form a film may be performed in a manner well known in the art, so are the transfer and lamination steps.

The exposure step may be performed in any manner known to a person of ordinary skill in the art, for example, by using UV light, visible light, electron beam or laser irradiation, and preferably UV light. Taking the photobase generator as an example, in the exposure step, the photobase generator in the exposed region is decomposed to release a basic compound, thus providing an environment suitable for the occurrence of the ring-closing reaction and the removal of the protecting group D or E. Then a post-exposure baking step is optionally performed to raise the temperature, whereby the protecting group D or E at the terminal amino group of the amic acid ester oligomer of Formula (1) or (1') is removed. In such case, due to the presence of the basic compound in the exposed region, cyclization occurs, and the —$NH_2$ formed due to the removal of the protecting group can react with the other end (that is, the terminal ester group (—COOR) and hydroxyl group (—COOH)), thereby effecting the polymerization.

An alkaline environment can facilitate the removal of the protecting group from the amic acid ester oligomer of Formula (1) or (1') according to the present invention and facilitate the occurrence of the cyclization and polymerization reaction. Therefore, in the baking step after exposure, the protecting group will not be removed from the amic acid ester oligomer in the non-exposed region, and no polymerization reaction occurs. In addition, by means of the baking step after exposure, the interference in the vertical direction of the film and the majority of the solvent can be removed, and the partial imidization and polymerization reaction may also take place in this step. According to the present invention, the baking step after exposure is preferably carried out for about 5 to about 30 min on a heat plate or in an oven at about 70 to about 150° C.

Due to the occurrence of ring closing and polymerization to the amic acid ester oligomer in the exposed region after the baking step after exposure, there is a difference between the solubilities of the amic acid ester oligomer in the exposed region and the amic acid ester oligomer in the non-exposed region. Therefore, the non-exposed region can be removed by dissolving it through development, and then the remainder is rinsed with water to obtain an intended pattern. The developing agent used is one well known to a person of ordinary skill in the art. Examples of the developing agent include for example, but are not limited to, an aqueous $K_2CO_3$ solution, an aqueous $Na_2CO_3$ solution, an aqueous KOH solution, an aqueous NaOH solution, or an aqueous TMAH solution.

Finally, the patterned film is cured so that the remaining polyamic acid is imidized and cyclized to form a polyimide, and the solvent and products derived from the photobase generator and the thermal base generator are removed. According to the present invention, the product generated after the decomposition of the photobase generator used has a low boiling point that is preferably not higher than 250° C. and more preferably not higher than 225° C., such that the product can be removed at a low temperature. According to an embodiment of the present invention, the curing step comprises: baking in one stage or in multiple stages at a temperature of about 250 to about 350° C. for about 30 to about 180 min.

The following examples are provided for exemplifying the embodiments and illustrating the technical features of the present invention, and not intended to limit the scope of the present invention. Any changes or equivalent arrangements that may be readily achieved by persons skilled in the art are within the protection scope of the present invention as defined by the appended claims.

Preparation of Polyimide Precursor (Amic Acid Ester Oligomer) and Composition Containing the Same Example 1 (Amic Acid Ester Oligomer of Formula (1), where the Protecting Group D is

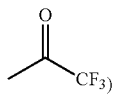

2.181 g (0.01 mol) pyromellitic dianhydride (referred to hereinafter as PMDA) was dissolved in 200 g N-methyl-2-pyrrolidinone (referred to hereinafter as NMP), and agitated for 2 hours at room temperature. 1.301 g (0.01 mol) 2-hydroxyethyl methacrylate (referred to hereinafter as HEMA) was slowly added dropwise, heated to 50° C., and agitated for reaction over 2 hours. Then, 10.8140 g (0.1 mol) para-phenylenediamine (referred to hereinafter as pPDA) was added to the solution, and completely dissolved. Then, 19.6308 g (0.09 mol) PMDA was added, and agitated for reaction over 6 hours at a fixed temperature of 50° C. Finally, 2.1003 g (0.01 mol) trifluoroacetic acid anhydride (referred to hereinafter as TFAA) was added and agitated for 1 hour.

Example 2 (Amic Acid Ester Oligomer of Formula (1), where the Protecting Group D is

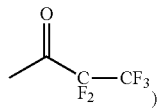

2.181 g (0.01 mol) PMDA was dissolved in 200 g NMP, and agitated for 2 hrs at room temperature. 1.301 g (0.01 mol) HEMA was slowly added dropwise, heated to 50° C. and agitated for reaction over 2 hours. Then, 10.8140 g (0.1 mol) pPDA was added to the solution, and completely dissolved. Then, 19.6308 g (0.09 mol) PMDA was added, and agitated for reaction over 6 hours at a fixed temperature of 50° C. Finally, 3.1005 g (0.01 mol) pentafluoropropionic anhydride (PTFA) was added and agitated for 1 hour.

Example 3 (Amic Acid Ester Oligomer of Formula (1), where the Protecting Group D is

2.181 g (0.01 mol) PMDA was dissolved in 200 g NMP, and agitated for 2 hrs at room temperature. 1.301 g (0.01 mol) HEMA was slowly added dropwise, heated to 50° C. and agitated for reaction over 2 hours. Then, 10.8140 g (0.1 mol) para-phenylenediamine (pPDA) was added to the solution, and completely dissolved. Then, 19.6308 g (0.09 mol) PMDA was added, and agitated for reaction over 6 hours at a fixed temperature of 50° C. Finally, 0.7408 g (0.01 mol) ethyl formate (EF) was added and agitated for 1 hour.

Example 4 (Amic Acid Ester Oligomer of Formula (1), where the Protecting Group D is

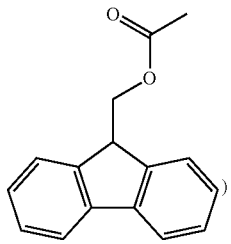 [SMILES: CC(=O)OCC1c2ccccc2-c2ccccc21]

2.181 g (0.01 mol) PMDA was dissolved in 200 g NMP, and agitated for 2 hrs at room temperature. 1.301 g (0.01 mol) HEMA was slowly added dropwise, heated to 50° C. and agitated for reaction over 2 hours. Then, 10.8140 g (0.1 mol) pPDA was added to the solution, and completely dissolved. Then, 19.6308 g (0.09 mol) PMDA was added, and agitated for reaction over 6 hours at a fixed temperature of 50° C. Finally, 2.5870 g (0.01 mol) 9-fluorenylmethoxycarbonyl chloride (Fmoc-Cl) was added and stirred for 1 hour, and then triethyl amine $Et_3N$) was added (for neutralizing HCl produced after the reaction).

Example 5 (Amic Acid Ester Oligomer of Formula (1), where the Protecting Group D is

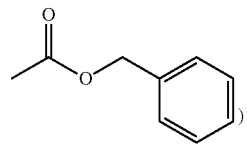

2.181 g (0.01 mol) PMDA was dissolved in 200 g NMP, and agitated for 2 hrs at room temperature. 1.301 g (0.01 mol) HEMA was slowly added dropwise, heated to 50° C. and agitated for reaction over 2 hours. Then, 10.8140 g (0.1 mol) pPDA was added to the solution, and completely dissolved. Then, 19.6308 g (0.09 mol) PMDA was added, and agitated for reaction over 6 hours at a fixed temperature of 50° C. Finally, 1.7059 g (0.01 mol) benzyl chloroformate (BC) was added and agitated for 1 hour, and then triethyl amine ($Et_3N$) was added.

Example 6 (Amic Acid Ester Oligomer of Formula (1), Here the Protecting Group D is

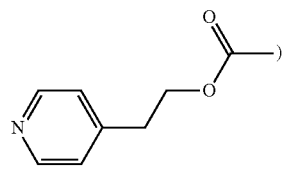

2.181 g (0.01 mol) PMDA was dissolved in 200 g NMP, and agitated for 2 hrs at room temperature. 1.301 g (0.01 mol) HEMA was slowly added dropwise, heated to 50° C. and agitated for reaction over 2 hours. Then, 10.8140 g (0.1 mol) pPDA was added to the solution, and completely dissolved. Then, 19.6308 g (0.09 mol) PMDA was added, and agitated for reaction over 6 hours at a fixed temperature of 50° C. Finally, 2.8807 g (0.01 mol) 2-(pyridin-4-yl)ethyl carbonochloridate was added and agitated for 1 hour, and then triethyl amine (Et₃N) was added.

Example 7 (Amic Acid Ester Oligomer of Formula (1), where the Protecting Group D is

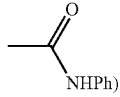

2.181 g (0.01 mol) PMDA was dissolved in 200 g NMP, and agitated for 2 hrs at room temperature. 1.301 g (0.01 mol) HEMA was slowly added dropwise, heated to 50° C. and agitated for reaction over 2 hours. Then, 10.8140 g (0.1 mol) pPDA was added to the solution, and completely dissolved. Then, 19.6308 g (0.09 mol) PMDA was added, and agitated for reaction over 6 hours at a fixed temperature of 50° C. Finally, 1.1912 g (0.01 mol) phenyl isocyanate was added and agitated for 1 hour.

Example 8 (Amic Acid Ester Oligomer of Formula (1), where the Protecting Group D is

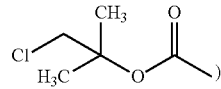

2.181 g (0.01 mol) PMDA was dissolved in 200 g NMP, and agitated for 2 hrs at room temperature. 1.301 g (0.01 mol) HEMA was slowly added dropwise, heated to 50° C. and agitated for reaction over 2 hours. Then, 10.8140 g (0.1 mol) pPDA was added to the solution, and completely dissolved. Then, 19.6308 g (0.09 mol) PMDA was added, and agitated for reaction over 6 hours at a fixed temperature of 50° C. Finally, 1.7102 g (0.01 mol) 1-chloro-2-methyl-propan-2-yl chloroformate was added and agitated for 1 hour, and then triethylamine (Et₃N) was added.

Example 9 (Amic Acid Ester Oligomer of Formula (1'), where the Protecting Group E is

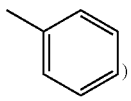

2.181 g (0.01 mol) PMDA was dissolved in 200 g NMP, and agitated for 2 hrs at room temperature. 1.301 g (0.01 mol) HEMA was slowly added dropwise, heated to 50° C. and agitated for reaction over 2 hours. Then, 10.8140 g (0.1 mol) pPDA was added to the solution, and completely dissolved. Then, 19.6308 g (0.09 mol) PMDA was added, and agitated for reaction over 6 hours at a fixed temperature of 50° C. Finally, 1.4057 g (0.01 mol) benzaldehyde was added and agitated for 24 hours.

Example 10 (Amic Acid Ester Oligomer of Formula (1), where the Protecting Group D is

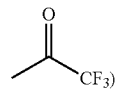

2.9422 g (0.01 mol) 4,4'-biphenyltetracarboxylic dianhydride (BPDA) was dissolved in 200 g NMP, heated to 50° C. and agitated for reaction over 2 hours. 0.6010 g isopropyl alcohol (IPA) was slowly added dropwise, and agitated for reaction over 2 hours at a fixed temperature of 50° C. Then, 20.024 g (0.1 mol) 4,4'-diamino-diphenyl ether (ODA) was added to the solution, and completely dissolved. Then, 26.4798 g (0.09 mol) BPDA was added, and agitated for reaction over 6 hours at a fixed temperature of 50° C. Finally, 2.1003 g (0.01 mol) TFAA was added and agitated for 1 hour.

Comparative Example 1 (where the Protecting Group is

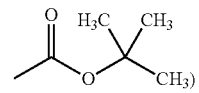

2.181 g (0.01 mol) PMDA was dissolved in 200 g NMP, and agitated for 2 hrs at room temperature. 1.301 g (0.01 mol) HEMA was slowly added dropwise, heated to 50° C. and agitated for reaction over 2 hours. 10.8140 g (0.1 mol) pPDA was added to the solution, and completely dissolved. Then, 19.6308 g (0.09 mol) PMDA was added, and agitated for reaction over 6 hours at a fixed temperature of 50° C. Finally, 2.1825 g (0.01 mol) di-tert-butyl dicarbonate (Boc₂O) was added and agitated for 1 hour.

Comparative Example 2 (where the Protecting Group is

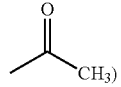

2.181 g (0.01 mol) PMDA was dissolved in 200 g NMP, and agitated for 2 hrs at room temperature. 1.301 g (0.01 mol) HEMA was slowly added dropwise, heated to 50° C. and agitated for reaction over 2 hours. Then, 10.8140 g (0.1 mol) pPDA was added to the solution, and completely dissolved. Then, 19.6308 g (0.09 mol) PMDA was added, and agitated for reaction over 6 hours at a fixed temperature of 50° C. Finally, 1.0209 g (0.01 mol) acetic anhydride (AA) was added and agitated for 1 hour.

Comparative Example 3 (where the Protecting Group is

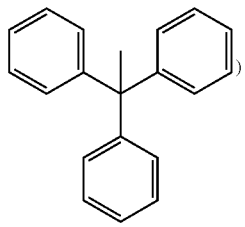 [SMILES: CC(c1ccccc1)(c1ccccc1)c1ccccc1]
)

2.181 g (0.01 mol) PMDA was dissolved in 200 g NMP, and agitated for 2 hrs at room temperature. 1.301 g (0.01 mol) HEMA was slowly added dropwise, heated to 50° C. and agitated for reaction over 2 hours. Then, 10.8140 g (0.1 mol) pPDA was added to the solution, and completely dissolved. Then, 19.6308 g (0.09 mol) PMDA was added, and agitated for reaction over 6 hours at a fixed temperature of 50° C. Finally, 2.7878 g (0.01 mol) trityl chloride and the catalyst N,N-Dimethylpyridin-4-amine (4-DMAP) were added and agitated for 1 hour.

Comparative Example 4 (where No Protecting Group is Present)

2.181 g (0.01 mol) PMDA was dissolved in 200 g NMP, and agitated for 2 hrs at room temperature. 1.301 g (0.01 mol) HEMA was slowly added dropwise, heated to 50° C. and agitated for reaction over 2 hours. Then, 10.8140 g (0.1 mol) pPDA was added to the solution, and completely dissolved. Then, 19.6308 g (0.09 mol) PMDA was added, and agitated for reaction over 6 hours at a fixed temperature of 50° C.

Polyimide Precursor Composition Comprising a Thermal Base Generator and Preparation of Polyimide The polyimide precursor compositions (in which the solvent was NMP) prepared in the examples and comparative examples were respectively added with 0.20 g thermal base generator

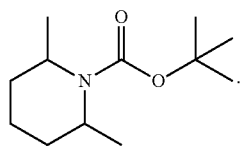
.

The individual polyimide precursor composition was evenly coated onto a copper clad laminate by a blade, and baked in an oven at a temperature ramping from room temperature to 150° C. within 35 min and maintained at 150° C. for 30 min in a first stage; and then ramping from 150 to 250° C. and maintained at 250° C. for 120 min in a second stage. After hard baking, the copper clad laminate was removed by etching to obtain a polyimide film.

Photosensitive Polyimide Precursor Composition

The polyimide precursor compositions prepared in the examples and comparative examples were respectively added with 0.2 g thermal base generator

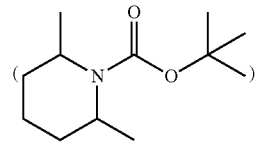

and 0.4 g photobase generator

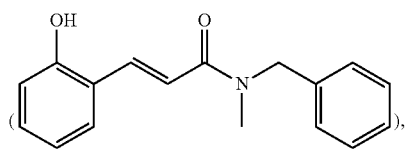 [SMILES: CN(Cc1ccccc1)C(=O)/C=C/c1ccccc1O]
, to obtain a photosensitive polyimide precursor composition.

Test Methods

Storage Stability:

The polyimide precursor compositions prepared in the examples and comparative examples were placed in an environment with a controlled temperature and humidity (25° C.; 55% RH). The change in the viscosity of the polyimide precursor composition at various storage time was measured by using the Brookfield viscometer, and the number of days when the viscosity is elevated or reduced to 50% of the initial viscosity was recorded.

Tensile Strength:

The tensile strength was a mechanical property of a polyimide film (after the copper clad laminate is removed) prepared with the polyimide precursor compositions prepared in the examples and comparative examples as measured according to the IPC-TM-650 (2.4.19) test method by using a universal tensile test machine.

Measurement of the Coefficient of Thermal Expansion (CTE) of the Polyimide Layer The CTE data of the polyimide film was measured by using a thermomechanical analyzer (TMA, a TA Q400 instrument manufactured by Texas instruments incorporated). The measurement range was between 0 and 500° C., and the temperature was increased at 10° C./min.

Thermal Degradation Test:

The $Td_{5\%}$ data of the polyimide film was measured by using a thermogravimetric analyzer (TMA, a TA Q5000 instrument manufactured by Texas Instruments Incorporated). The measurement range was between 0 and 600° C., and the temperature was increased at 10° C./min.

Photosensitivity Test:

The photosensitive polyimide precursor composition obtained in Example 1 was evenly coated onto a copper clad laminate substrate by using a spin coater. It was dried for 3-5 min in an oven at 90° C., then exposed to UV, and baked for 10-30 min in an oven at 120-150° C. The film thickness was about 20 μm. The film was soaked in 1 wt % aqueous $K_2CO_3$ solution and developed to form a pattern. The film thicknesses of the exposed and non-exposed regions were measured after soaking for 30 seconds, and the solubility in the aqueous $K_2CO_3$ solution was calculated. The results are shown in Table 2.

<Test Results>

The related test results of the examples and comparative examples are shown in Tables 1-2.

TABLE 1

| | Storage stability (days) | Tensile strength (MPa) | CTE (ppm/° C.) | Thermal degradaton (° C.) |
|---|---|---|---|---|
| Example 1 | 25 | 296 | 2.0 | 610 |
| Example 2 | 23 | 300 | 1.8 | 604 |
| Example 3 | 28 | 290 | 2.1 | 595 |
| Example 4 | 21 | 310 | 1.8 | 614 |
| Example 5 | 26 | 285 | 2.2 | 590 |
| Example 6 | 27 | 270 | 3.0 | 581 |
| Example 7 | 23 | 280 | 2.1 | 595 |
| Example 8 | 20 | 305 | 1.8 | 611 |
| Example 9 | 23 | 265 | 2.8 | 577 |
| Example 10 | 24 | 230 | 28 | 531 |
| Comparative Example 1 | 14 | 290 | 1.8 | 605 |
| Comparative Example 2 | 16 | 201 | 11 | 510 |
| Comparative Example 3 | 12 | 191 | 14 | 491 |
| Comparative Example 4 | 10 | 293 | 2.1 | 615 |

It can be known from Table 1 that the polyimide precursor composition of the present invention has excellent storage stability, and the polyimide prepared with the polyimide precursor composition of the present invention has good tensile strength and high thermal degradation temperature as a whole. Moreover, the polyimide precursor composition of the present invention may be selected according to the practical area of application, so as to prepare a polyimide having a suitable coefficient of thermal expansion.

TABLE 2

| | Photosensitivity test | | | |
|---|---|---|---|---|
| Example 1 | Film thickness before development (μm) | Film thickness after development (μm) | Development time (sec) | Dissolution rate (μm/min) |
| Exposed region | 10 | 9.5 | 30 | 1.0 |
| Non-exposed region | 10 | 0 | 30 | 20 |

It can be known from Table 2 that after development of the photosensitive polyimide precursor composition of the present invention, there is a significant difference between the solubilities of the composition in the exposed and non-exposed regions after exposure, whereby the composition in the non-exposed region can be removed, leaving an intended pattern. Therefore, the photosensitive polyimide precursor composition of the present invention is applicable to development by light sensing and to a patterning process, and can be used in a photoresist, a buffer layer of a semiconductor, a redistribution layer of an IC package and a coverlay, in place of the conventional photosensitive polyimide.

The above-described embodiments of the present invention are intended to be illustrative only. Numerous alternative embodiments may be devised by persons skilled in the art without departing from the scope of the following claims.

What is claimed is:

1. An auric acid ester oligomer, having a structure of Formula (1) or (1') below:

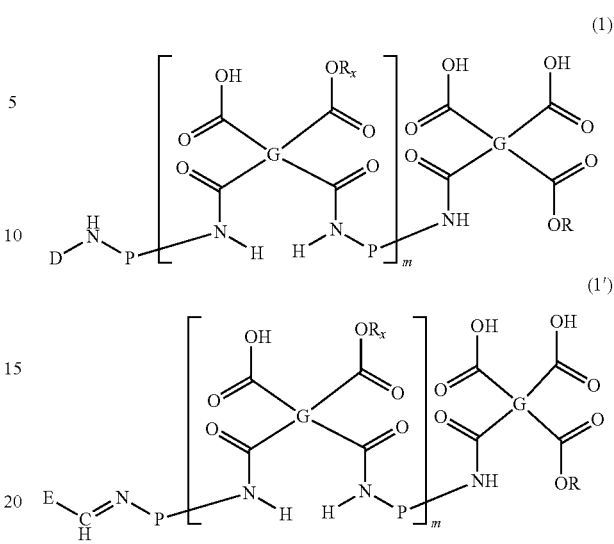

wherein

G is each independently a tetravalent organic group;

P is each independently a divalent organic group;

R is $C_1$-$C_{14}$ alkyl, $C_6$-$C_{14}$ aryl unsubstituted or substituted with one or more groups selected from hydroxyl and $C_1$-$C_4$ alkyl, or a group having an ethylenically unsaturated bond;

$R_x$ is each independently H, $C_1$-$C_8$ alkyl, or a group having an ethylenically unsaturated bond;

D is

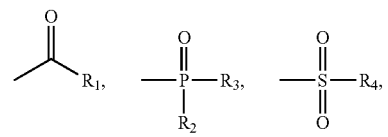

a 5- or 6-membered heterocyclyl group containing nitrogen substituted with $C_1$-$C_8$ alkyl, or $C_1$-$C_8$ alkyl substituted with a 5- or 6-membered heterocyclyl group containing nitrogen;

wherein $R_1$ is H, methyl, trifluoromethyl, pentafluoroethyl,

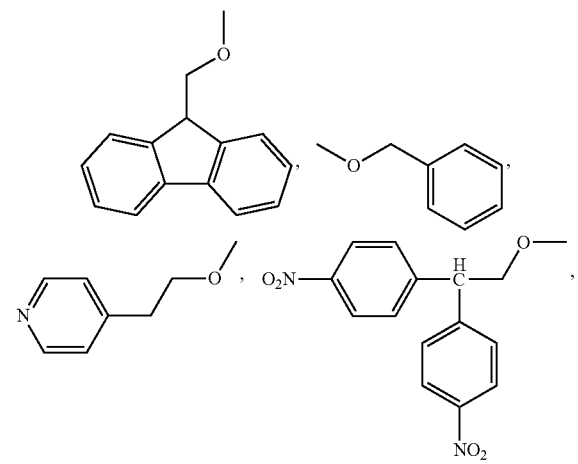

-continued

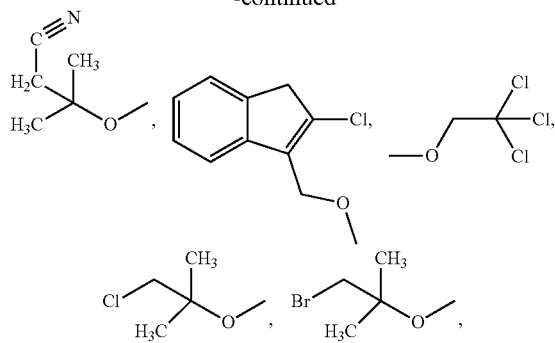

—NHPh or —NHCH$_3$;
R$_2$ and R$_3$ are halo; R$_4$ is methyl or

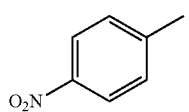

and
E is

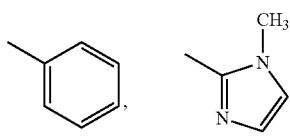

or —N(CH$_3$)$_2$; and
m is an integer from 1 to 100.

2. The oligomer according to claim 1, wherein the group having an ethylenically unsaturated bond is selected from the group consisting of: ethenyl, propenyl, methylpropenyl, n-butenyl, iso-butenyl, ethenylphenyl, propenylphenyl, propenyloxymethyl, propenyloxyethyl, propenyloxypropyl, propenyloxybutyl, propenyloxypentyl, propenyloxyhexyl, methylpropenyloxymethyl, methylpropenyloxyethyl, methylpropenyloxypropyl, methylpropenyloxybutyl, methylpropenyloxypentyl, methylpropenyloxyhexyl, and a group of Formula (2):

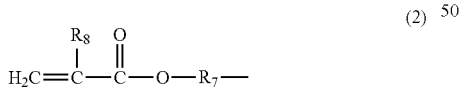
(2)

wherein R$_7$ is phenylene, C$_1$-C$_8$ alkylene, alkenylene, cycloalkylene, C$_1$-C$_8$ hydroxyalkylene or

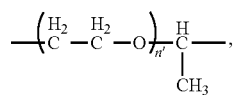

wherein n' is an integer from 1 to 4, and R$_8$ is hydrogen or C$_1$-C$_4$ alkyl.

3. The oligomer according to claim 1, wherein R is each independently selected from the group consisting of:

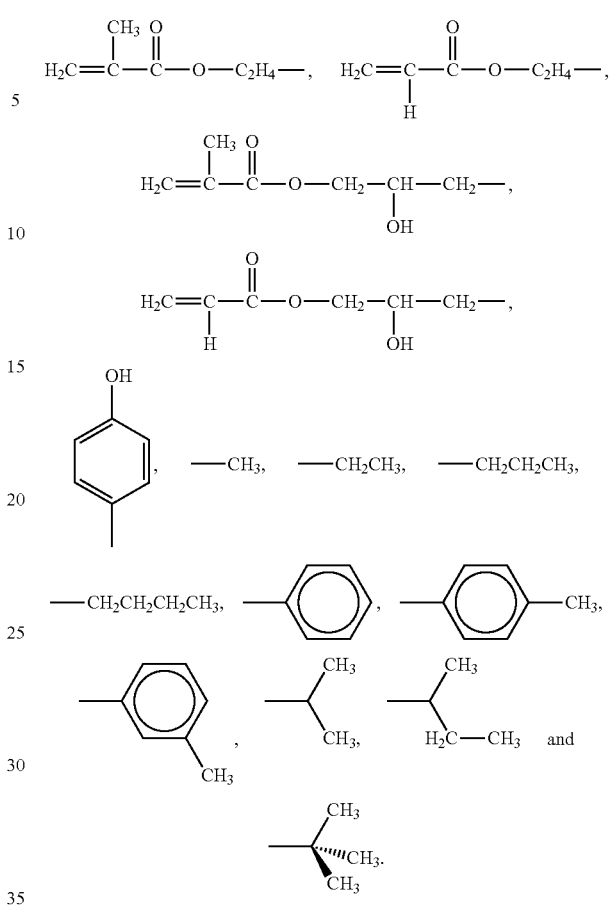

4. The oligomer according to claim 1, wherein the tetravalent organic group is selected from the group consisting of:

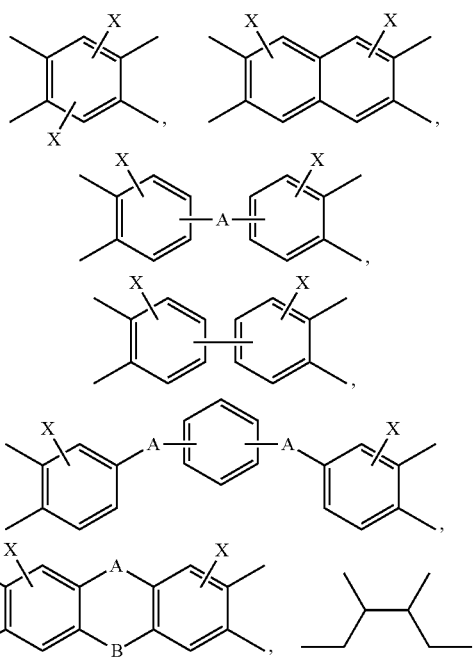

-continued

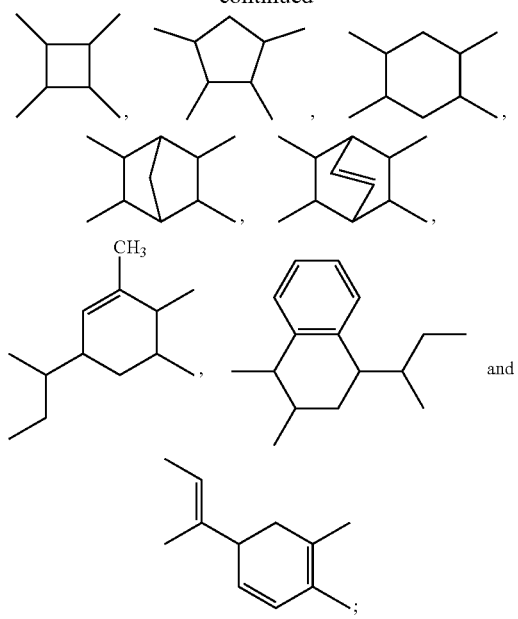

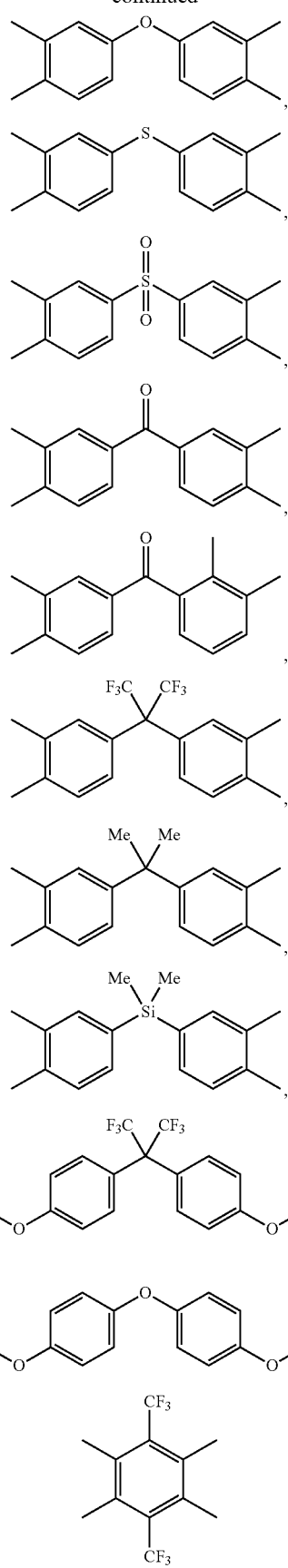

wherein X is each independently hydrogen, halo, $C_1$-$C_4$ perfluoroalkyl, or $C_1$-$C_4$ alkyl; and A and B at each occurrence are each independently a covalent bond, $C_1$-$C_4$ alkylene unsubstituted or substituted with one or more groups selected from hydroxyl and $C_1$-$C_4$ alkyl, $C_1$-$C_4$ perfluoroalkylene, $C_1$-$C_4$ alkyleneoxy, silylene, —O—, —S—, —C(O)—, —OC(O)—, —S(O)$_2$—, —C(=O)O—($C_1$-$C_4$ alkylene)-OC(=O)—, —CONH—, phenyl, biphenylyl, or

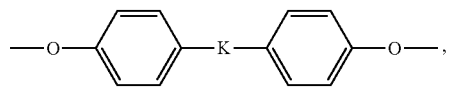

wherein K is —O—, —S(O)$_2$—, $C_1$-$C_4$ alkylene or $C_1$-$C_4$ perfluoroalkylene.

5. The oligomer according to claim 1, wherein the tetravalent organic group is selected from the group consisting of:

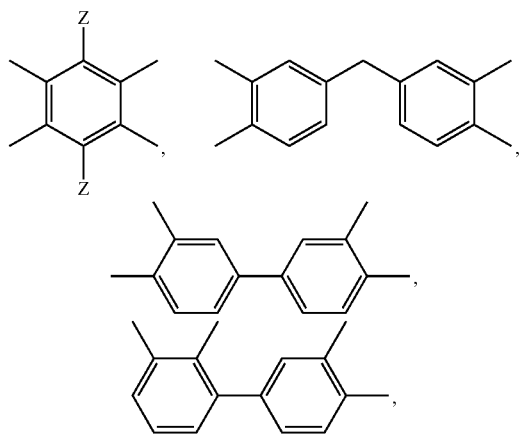

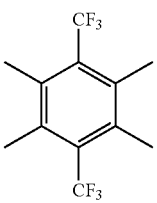

-continued

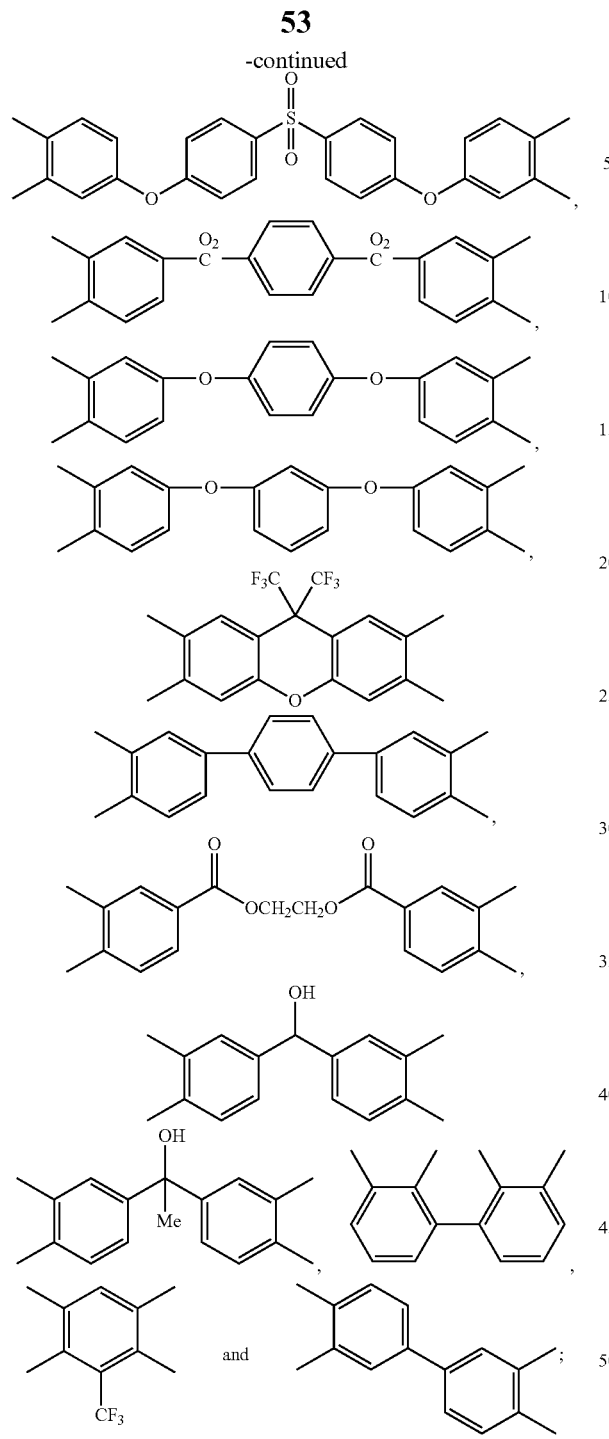

wherein Z is each independently hydrogen, methyl, trifluoromethyl or halo.

6. The oligomer according to claim 1, wherein the divalent organic group is selected from the group consisting of:

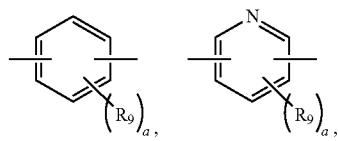

-continued

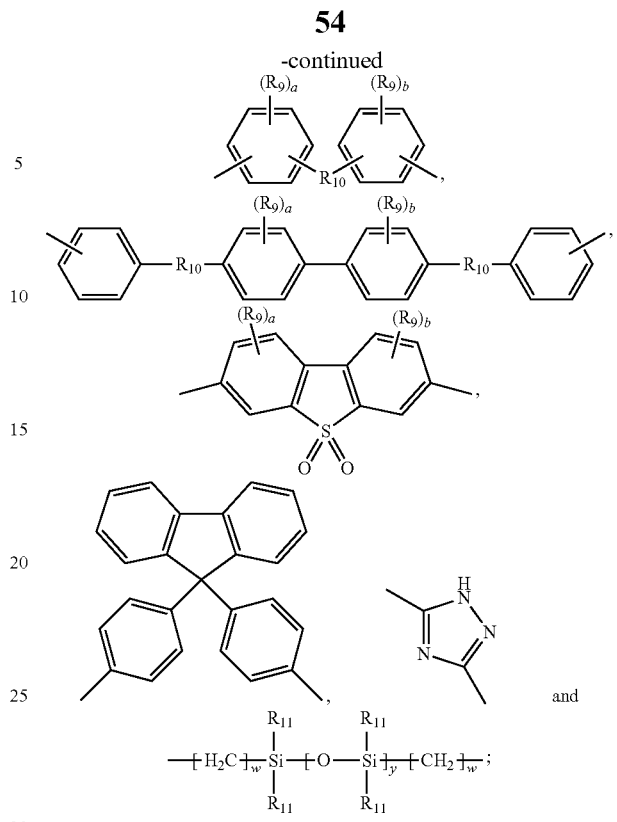

wherein:
$R_9$ is each independently H, $C_1$-$C_4$ alkyl, perfluoroalkyl, alkoxy, halo, —OH, —COOH, —NH$_2$ or —SH;
a is each independently an integer from 0 to 4;
b is each independently an integer from 0 to 4; and
$R_{10}$ is a covalent bond or a group selected from the group consisting of:

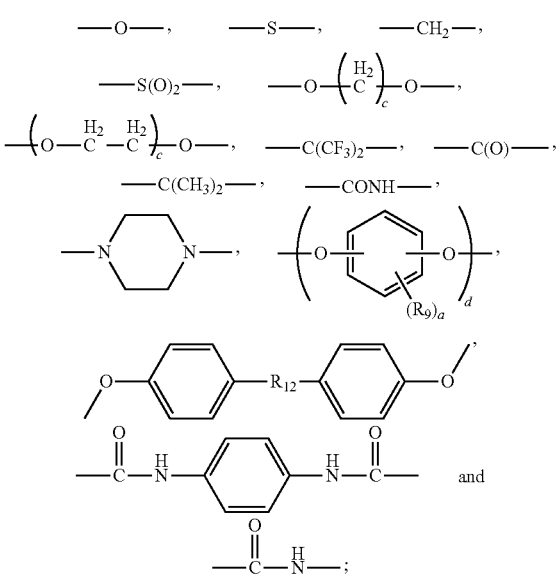

wherein
c and d are each independently an integer from 1 to 20;
$R_9$ and a are as defined above;

$R_{12}$ is —S(O)$_2$—, —C(O)—, a covalent group, $C_1$-$C_4$ alkyl or $C_1$-$C_4$ perfluoroalkyl;
$R_{11}$ is each independently hydrogen, halo, phenyl, $C_1$-$C_4$ alkyl, or $C_1$-$C_4$ perfluoroalkyl; and
w and y are each an integer from 1 to 3.
7. The oligomer according to claim 6, wherein the divalent organic group is selected from the group consisting of:
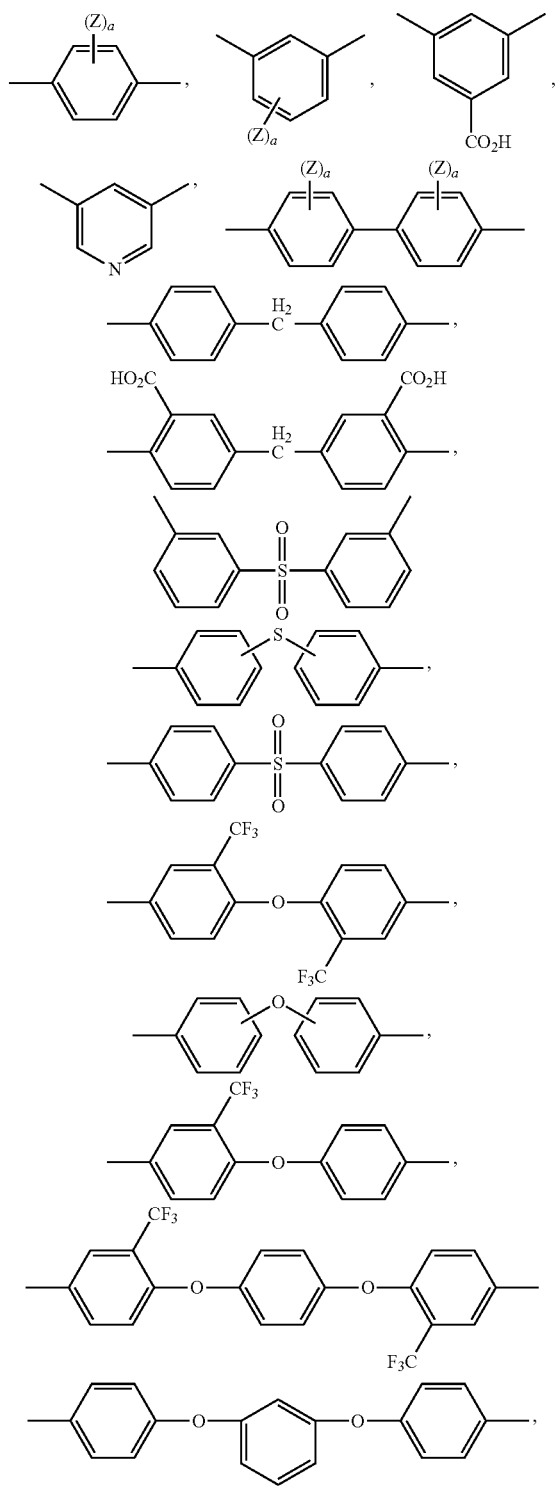
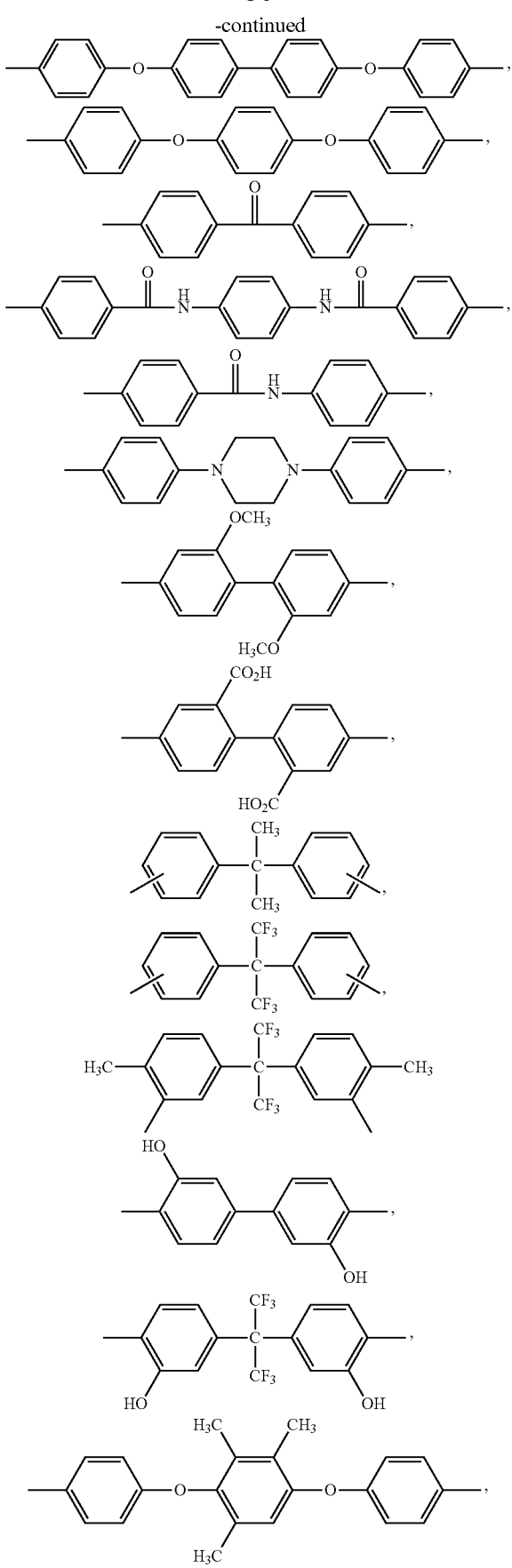

-continued

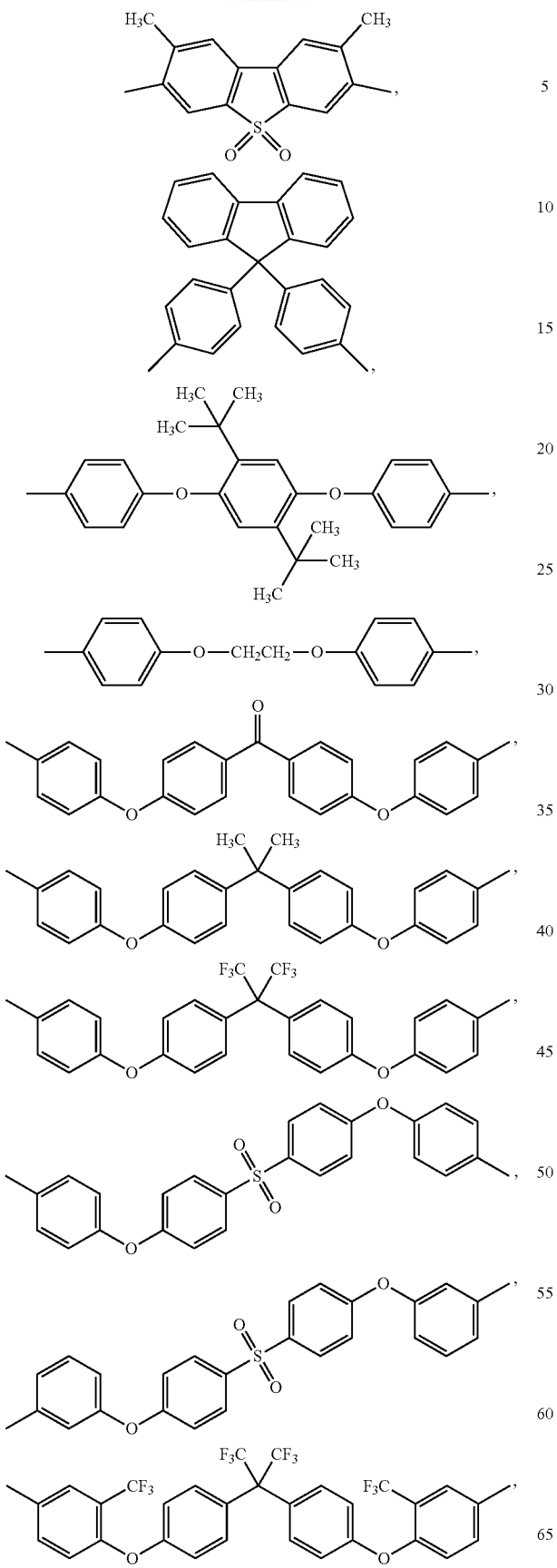

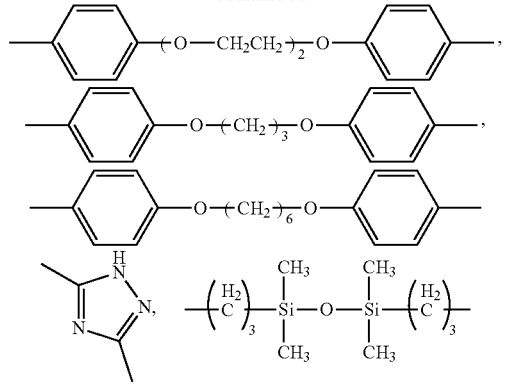

and a combination thereof,
wherein:
a is each independently an integer from 0 to 4; and
Z is each independently hydrogen, methyl, trifluoromethyl or halo.

8. The oligomer according to claim 1, wherein the substituent D is:
(i)

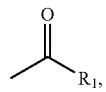

wherein $R_1$ is H, methyl, trifluoromethyl, pentafluoroethyl,

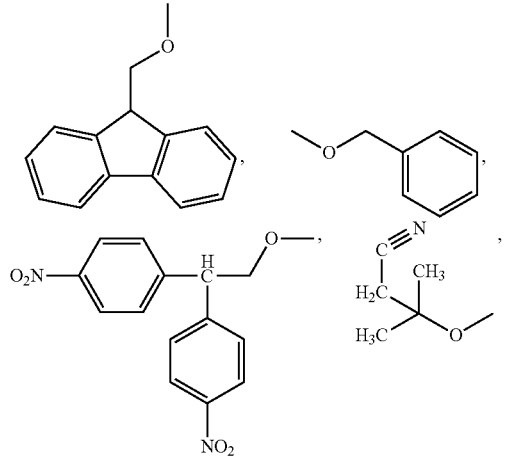

—NHPh or —NHCH$_3$;
(ii)

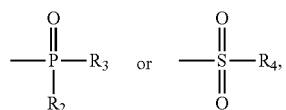

wherein $R_2$ and $R_3$ are each independently —F or —Cl; and $R_4$ is methyl or 9. The oligomer according to claim 1, wherein D is

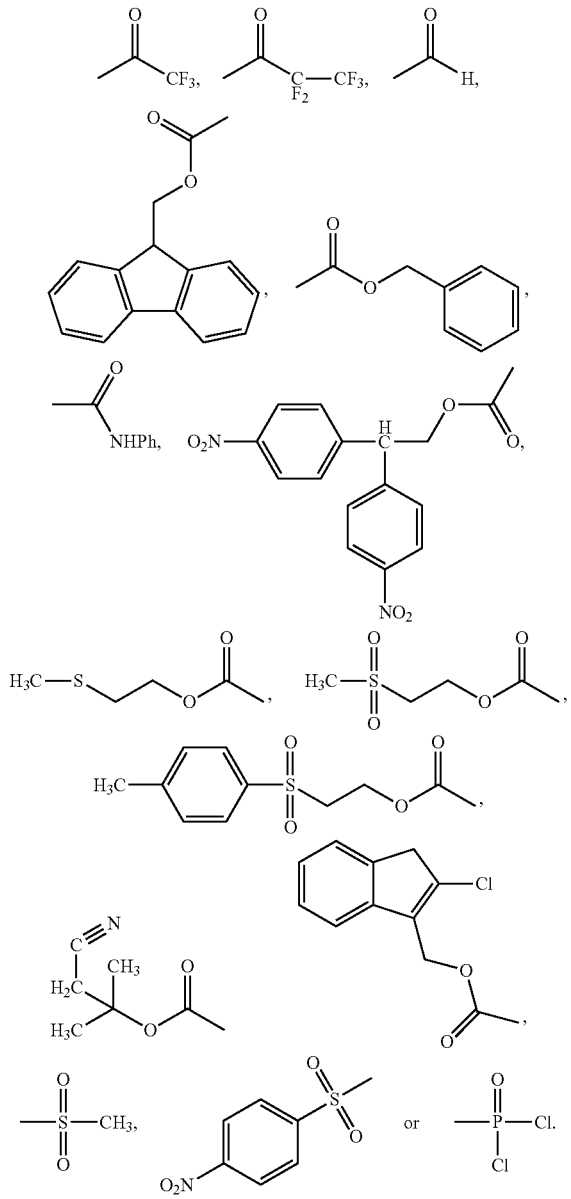

10. The oligomer according to claim 1, wherein m is an integer from 2 to 25.

11. A polyimide precursor composition, comprising an oligomer according to claim 1 and a solvent.

12. The composition according to claim 11, wherein the solvent is selected from the group consisting of N-methyl-pyrrolidone, dimethylacetamide, dimethyl formamide, dimethyl sulfoxide, toluene, xylene, diethylene glycol dibutyl ether, N-octyl-2-pyrrolidone, N,N-dimethylcapramide, and a mixture thereof.

13. The composition according to claim 11, wherein the polyimide precursor composition is a photosensitive polyimide precursor composition.

14. The composition according to claim 13, further comprising a photobase generator, wherein the photobase generator is selected from the group consisting of:

and a combination thereof;

wherein $R_{17}$ is methyl or ethyl; $R_{15}$ is methyl, ethyl, propyl, phenyl, benzyl, —$CH_2CH_2OH$, 15. The composition according to claim 14, wherein based on 100 parts by weight of the auric acid ester oligomer, the content of the photobase generator is about 0.5 to about 20 parts by weight.

16. The composition according to claim 11, further comprising a thermal base generator.

17. A polyimide prepared with the oligomer according to claim 1.

18. A polyimide prepared with the precursor composition according to claim 11.

\* \* \* \* \*